United States Patent
Li et al.

(10) Patent No.: US 12,026,912 B2
(45) Date of Patent: Jul. 2, 2024

(54) APPARATUS AND METHODOLOGY FOR AIMING POINT AND AIMING DEVICE 6DOF DETECTION USING IMAGE REGISTRATION

(71) Applicants: Wen Li, Cumming, GA (US); Ming Yang, Johns Creek, GA (US)

(72) Inventors: Wen Li, Cumming, GA (US); Ming Yang, Johns Creek, GA (US)

( * ) Notice: Subject to any disclaimer, the term of this patent is extended or adjusted under 35 U.S.C. 154(b) by 148 days.

(21) Appl. No.: 17/473,297

(22) Filed: Sep. 13, 2021

(65) Prior Publication Data
US 2023/0079864 A1 Mar. 16, 2023

(51) Int. Cl.
*G06T 7/80* (2017.01)
*G03B 17/56* (2021.01)
*G06N 3/045* (2023.01)
*G06T 7/73* (2017.01)

(52) U.S. Cl.
CPC .............. *G06T 7/80* (2017.01); *G03B 17/561* (2013.01); *G06T 7/74* (2017.01); *G06N 3/045* (2023.01); *G06T 2207/10028* (2013.01); *G06T 2207/20084* (2013.01); *G06T 2207/30244* (2013.01)

(58) Field of Classification Search
CPC .... G06T 7/80; G06T 7/74; G06T 7/70; G06T 7/73; G06T 7/60; G06T 2207/10028; G06T 2207/20084; G06T 2207/30244; G03B 17/561; G03B 17/58; G06N 3/045
See application file for complete search history.

(56) References Cited

U.S. PATENT DOCUMENTS

| | | | |
|---|---|---|---|
| 9,010,002 B2 | 4/2015 | Popa-Simil | |
| 9,435,612 B2 | 9/2016 | Hancosky | |
| 10,094,638 B2 | 10/2018 | Grace, Jr. et al. | |
| 2009/0086014 A1* | 4/2009 | Lea | G01C 25/00 348/E5.062 |

(Continued)

OTHER PUBLICATIONS

Shapiro, L.S.; Brady, JM, Feature-based correspondence: an eigenvector approach, Image and Vision Computing, 1992, 10(5): 283-288.

(Continued)

*Primary Examiner* — John W Miller
*Assistant Examiner* — Sean N. Haiem
(74) *Attorney, Agent, or Firm* — MEDLER FERRO WOODHOUSE & MILLS PLLC

(57) ABSTRACT

A system and a method for determining aiming point and/or six degrees of freedom of an aiming device. The system include the aiming device, a camera mounted thereon, and a computing device. The aiming point is an intersection between a line of interest (LOI) of the aiming device and surface of an aimed object. A parallel auxiliary line (PAL) is a line starting from the camera and parallel to the LOI. The PAL is a point (PAL-T) in a template image captured by the first camera. The computing device is configured to: provide a reference image; map the template image to the reference image; project the PAL-T to the reference image using the mapping relation to obtain a reference point (PAL-R); determine 3D coordinates PAL-3D of the PAL-R; and determine 3D coordinates of the aiming point based on the PAL-3D and a relationship between the LOI and the PAL.

20 Claims, 13 Drawing Sheets

(56) References Cited

U.S. PATENT DOCUMENTS

| | | | |
|---|---|---|---|
| 2013/0278755 A1* | 10/2013 | Starns | G06T 7/68 |
| | | | 382/106 |
| 2019/0034033 A1* | 1/2019 | Ikeda | G06F 3/041 |
| 2019/0107700 A1* | 4/2019 | Lee | A61B 90/20 |
| 2019/0321126 A1* | 10/2019 | Otto | G06T 7/74 |
| 2020/0242793 A1* | 7/2020 | Fernandez-Dorado | |
| | | | G01B 11/26 |
| 2021/0004970 A1* | 1/2021 | Ruther | H04N 23/54 |
| 2021/0042522 A1* | 2/2021 | Dias Bispo Carvalho | |
| | | | G06T 7/70 |
| 2021/0217196 A1* | 7/2021 | Shimamura | G06T 7/77 |
| 2022/0026920 A1* | 1/2022 | Ebrahimi Afrouzi | G06N 3/045 |

OTHER PUBLICATIONS

Lowe, DG, Distinctive image features from scale-invariant keypoints, Int. J. Comput. Vis., 2004, 60(2): 91-11.

Bay, H; Tuytelaars, T; Gool, LV, Surf: speeded up robust features, Computer Vision—ECCV 2006, 3951.

Li, Zihan; Dong, Zhen; Xu, Anxi; He, Zhihua; Zhu, Xiaoxiang, A robust image sequence registration algorithm for videosar combining surf with inter-frame processing, IEEE Xplore, 2019.

Zhang, Ying; Yang, Lei; Wang, Zhujun, Research on video image stitching technology based on SURF, IEEE-2012 Fifth International Symposium on Computational Intelligence and Design, 2012.

Cantzler, H, Random sample consensus (RANSAC).

Chum, ); Matas, J, Matching with PROSAC—progressive sample consensus, 2005 IEEE Computer Society Conference on Computer Vision and Pattern Recognition (CVPR'05), 2005, 1: 220-226.

\* cited by examiner

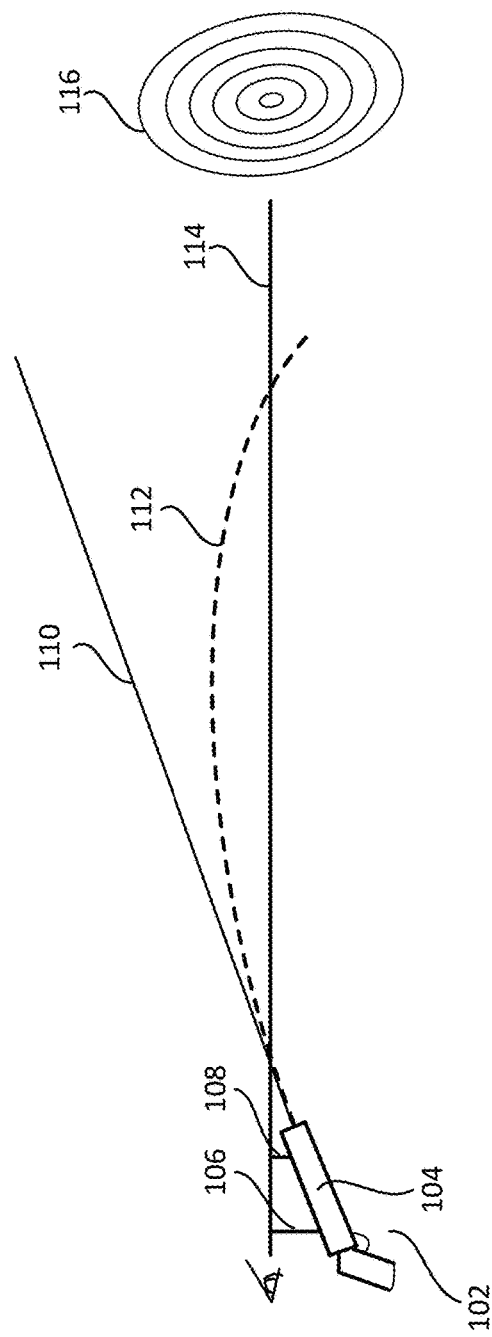
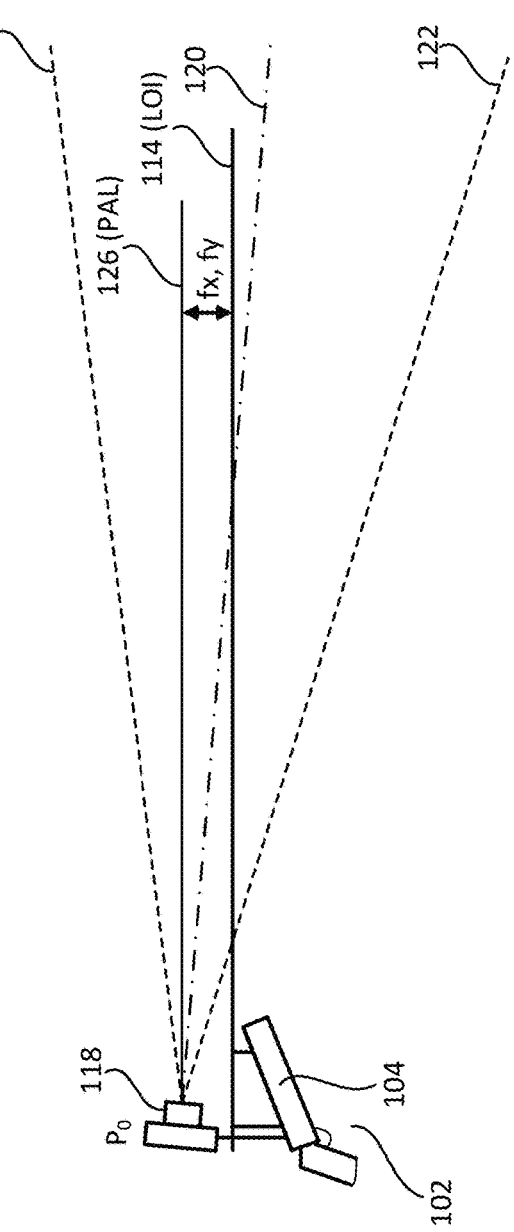
FIG. 1A
FIG. 1B

| Approach | This Disclosure | Laser based | Light marker | Inertial sensor | Indoor GPS |
|---|---|---|---|---|---|
| Aiming Accuracy (mrad) | High (0.5) | Very high (0.2) | Low (8) | Low (5) | Low (10) |
| Location accuracy (cm) | High (5) | Doesn't support | Very high (0.2) | Very low (50) | Low (30) |
| Attitude accuracy (deg.) | High (1) | Doesn't support | Very high (0.5) | Low (3) | Doesn't support or very low (20+) |
| Time delay (sec.) | No delay (0) | No delay (0) | No delay (0) | Delay (0.5) | Delay (1) |
| Device and infrastructure | Simple (1) | A Little complex (10) | Very complex (100) | Simple (1) | A little complex (5) |
| Hardware and infrastructure Cost | Middle (5) | Middle (5) | Very high (100) | Low(2) | Very low (1) |
| The number of device limitation | No limitation | Very limited | Very limited | No limitation | No limitation |
| System (HW+SW) complexity | Simple (1) | Very complex (10) | Very complex (10) | Very simple (0.5) | Simple (1) |
| Operation environment requirement | Low | High. Indoor, dark | High indoor dark | Low, but cannot on motion platform | Low, but cannot on big space |

FIG. 3

APPARATUS AND METHODOLOGY FOR AIMING POINT AND AIMING DEVICE 6DOF DETECTION USING IMAGE REGISTRATION

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD OF THE DISCLOSURE

The present disclosure relates generally to location recognition, and more specifically related to determining aiming point and location/attitude of a device using template matching.

BACKGROUND OF THE DISCLOSURE

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A lot of equipment and instruments, such as range finder, firearm weapons, surveying instruments, head-mounted device (HMD), require aiming function, with or without human involvement. Here, this kind of equipment and instruments are abstracted as "aiming devices". Some aiming devices provide a certain mechanism to help human operators to aim, for example, iron sight, telescope, holographic sight. Some other aiming devices install instruments or sensors to detect aiming points objectively without human in the loop, and this is called objective aiming point detection. Some particular aiming devices, such as training simulation weapons, adopt both mechanisms and use objective aiming point detection instruments or sensors to compare with and verify aiming results obtained from human operators. Also, when an aiming device is used in an engineering system, aiming device location and attitude are required, and they are obtained using a variety of engineering implementations.

In the objective aiming point detection area, the most popular designs are based on one of three main categories of approaches: (1) optics-based approach; (2) inertia sensor-based approach; and (3) electronic/sound speed-based approach.

Aiming devices designed based on the optics may use laser or light markers. When an aiming device uses a laser (such as the system used by InVeris Training Solutions), it mounts a laser radiator to fire a laser light thereon, and then detects laser spot location on the surface of the aimed object. The aiming point of the aiming device can be determined according to the detected laser spot. This approach provides the highest detection accuracy of the aiming point and is used in most high-end products. However, this implementation only detects the aiming point on the aimed surface, but not the location/attitude of the aiming device. Further, the laser mounted on the aiming device only works in certain environment, such as indoor, and/or dark areas. Furthermore, if multiple aiming devices are simultaneously used, it is very difficult to determine which laser spot belongs to which aiming device. It will be extremely difficult if multiple laser spots overlap on the same point on the aimed surface/object. To address these issues, in real engineering projects, some very complicated and expensive methodologies have to be used, such as different laser wave lengths, code division multiple access, and/or time division multiple access. These efforts significantly increase the complexity level and cost of the system, but still cannot provide satisfactory solutions in many scenarios. Thus, the number of aiming devices that can be simultaneously used in laser-based systems is still very limited.

When an aiming device uses light markers (such as the system used by Motion Reality), it installs multiple light markers thereon. The positions of the markers on the aiming device are known, and multiple cameras are installed in the room at known locations, to detect and collect markers' location. At a certain moment, the coordinates of a light maker in the views of different cameras are not the same. For a specific light marker, its different images captured by different cameras can be used to calculate its 3D location. If there are more than three light markers attached to the aiming device and each light marker's 3D location is detected, the aiming device's six degrees of freedom (6DOF) information can be derived. Further, if the aimed object location/attitude is known, the geometrical relationship between the aiming device and the aimed object will be created and the aiming point can be calculated. This approach is a combination of optics and geometry. The problem with this approach is that the system is too complicated and expensive, and it only works in a very well configured setting. The math and geometrical calculation will involve a lot of numerical approximate errors and truncated errors. Because of errors on light marker location detection and the limited distances among the light markers attached to the same arming device, the final result accuracy is lower than the laser-based approach for at least one order. Because of the limitation on the number of total light markers that can be used, the number of aiming devices supported is also limited. Finally, when multiple light markers from different aiming devices are mixed, it is hard for the mathematical algorithm to distinguish the light markers-aiming device pairs, which will fail the whole system. Moreover, it may be difficult or even infeasible to install a required light marker at a specific location on an aiming device.

The inertia sensor-based approach, such as inertial measurement unit (IMU) sensors of LORD Sensing System, mounts inertia sensors on the aiming device to track the device's location and attitude change relative to the starting point. Assuming 6DOF information of the aiming device at the initial point is well known, the device location and attitude, as well as aiming line direction, could be calculated using inertia sensor's output data, and the device's aiming point on the aimed object surface could be derived. This approach could provide both the aiming point position and 6DOF information of the aiming device. The disadvantages are low accuracy and—high latency. Because the inertia sensors' raw data output is not position data, but acceleration, the raw data need two orders of integral over time. The first integral generates velocity data, while the second integral generates position data. Thus, any sensor raw noise will be magnified over time and thus result in a large position value shift in the final result. To reduce error, filtering algorithms have to be used over sample data during data post-processing. This processing brings output lags and large delays.

The electronic/sound-based approach (such as the system used by Decawave DWM100) could be understood as an indoor global positioning system (GPS). Similar to the principle used by GPS, the indoor GPS installs several transmitter anchors at known locations in the room and also attaches a receiver on the aiming device. The transmitters broadcast electrical or ultrasound signals. The receiver mounted on the aiming device receives the signal and uses the time difference of signals from different anchors to calculate the position of the receiver. Using this approach, the device's 3D location information could be obtained. Theoretically, if there are three receivers mounted on the device and their geometrical positions on the device are known, the device's attitude could be calculated by the 3D locations of the three receivers, and thus the device's aiming point could be derived if the aimed object's location is known. The problem with this approach is that the calculation of the receivers' positions requires a time-consuming filtering process to reduce sampling noise. It is hard to use this approach to achieve the required aiming point detection accuracy without significant delay.

In summary, for aiming device's aiming point and 6DOF detection, the currently available approaches are either very complicated and expensive, or inaccurate. No approach could provide both accurate aiming point and aiming device's 6DOF simultaneously. Therefore, the need for an efficient approach exists in the art to address the aforementioned deficiencies and inadequacies.

SUMMARY OF THE DISCLOSURE

In certain aspects, the present disclosure relates to a system for determining an aiming point of an aiming device and optionally the six degrees of freedom (6DOF) of the aiming device. In certain embodiments, the system includes the aiming device configured to aim toward an aimed object, a first camera mounted on the aiming device, and a computing device in communication with the first camera.

In certain embodiments, the first camera is configured to capture a template image of the aimed object. The aiming point is an intersection between a line of interest (LOI) of the aiming device and surface of the aimed object, a parallel auxiliary line (PAL) is a line that starts from optical center of the first camera and is parallel to the LOI, and the PAL is shown as a point (PAL-T) in the template image. The computing device comprises a processor and a storage device storing computer executable code, and the computer executable code, when executed at the processor, is configured to:

provide a reference image of the aimed object, wherein each point in the reference image has corresponding 3D coordinates in a 3D world coordinate system;

receive the template image from the first camera;

map the template image to the reference image to obtain a mapping relation;

project the PAL-T in the template image to the reference image using the mapping relation to obtain a reference point (PAL-R);

determine 3D coordinates PAL-3D of the PAL-R; and determine 3D coordinates of the aiming point based on the PAL-3D and a relationship between the LOI and the PAL.

In certain embodiments, the mapping is performed by neural network or any other image registration techniques.

In certain embodiments, the aiming device comprises a gun, a robotic device, and a range finder, the first camera is configured to take a template video comprising a plurality of the template images, and the computer executable code is further configured to obtain a track of the aiming point.

In certain embodiments, the system further includes a second camera. The second camera is mounted stationary in a location close to the aimed object and is configured to take the reference image.

In certain embodiments, the computer executable code is configured to map the template image to the reference image by:

extracting template keypoints from the template image and constructing template keypoint descriptors for the template keypoints;

extracting reference keypoints from the reference image and constructing reference keypoint descriptors for the reference keypoints;

matching the template keypoints to the reference keypoints based on the template keypoint descriptors and reference keypoint descriptors to obtain matched keypoint pairs; and obtaining a homography transformation matrix between the template image and the reference image using the matched keypoint pairs.

In certain embodiments, the step of extracting template keypoints is performed using speeded up robust features (SURF) algorithm, and the SURF has a dynamic threshold. In certain embodiments, the dynamic threshold for the template images is determined by:

extracting template keypoints from the template image using a current threshold;

determining if a number of the extracted template keypoints is in a range of [a, b], wherein a and b are positive integers, and b>a;

when the number of extracted template keypoints is within the range of [a, b]: constructing template keypoint descriptors and keeps the current threshold;

when the number of the extracted template keypoints is less than a: reducing the current threshold by Reduced Threshold=Current threshold/C, constructing the template keypoint descriptors, and using the reduced threshold for a next template image; and when the number of the extracted template keypoints is greater than b: increasing the current threshold by Increased threshold=Current threshold×C, constructing the template keypoint descriptors, and using the increased threshold for the next template image, wherein C is a positive number in a range of 1.2-10.

In certain embodiments, the step of matching the template keypoints to the reference keypoints is performed using k-nearest neighbor (k-NN), and the matched keypoints by k-NN is determined by:

determining a first distance between each of the template keypoint to a nearest reference keypoint, determining a second distance between the template keypoint to a second nearest reference keypoint, and calculating a matching ratio of the template keypoint by dividing the first distance by the second distance;

ranking the template keypoints based on their matching ratios;

selecting a first number of template keypoints having smaller matching ratios; and forming the matched keypoint pairs using the first number of template keypoints and their matched reference keypoints, wherein the first number is a positive integer in a range of 50-500.

In certain embodiments, the step of obtaining the homography transformation matrix is performed by:

constructing a plurality of candidate homography transformation matrix models by progressive sample consensus (PROSAC) using different reprojection error thresholds; and selecting the candidate homography transformation matrix models having the lowest mean square error (MSE) as the homography transformation matrix.

In certain embodiments, the computer executable code is configured to determine the 3D coordinates of the aiming point using six degrees of freedom (6DOF) of the aiming device, and the computer executable code is further configured to determine the 6DOF of the aiming device by:

selecting three template points $pt_1$, $pt_2$ and $pt_3$ in the template image;

calculating three template angles $\alpha1$, $\alpha2$, $\alpha3$ based on distances between the three template points in the template image and a center of the template image;

projecting the three template points $pt_1$, $pt_2$ and $pt_3$ in the template image to the reference image to obtain three reference point $pr_1$, $pr_2$, and $pr_3$, wherein the three reference points have three corresponding points $P_1$, $P_2$, and $P_3$, in the 3D world coordinates;

calculating 3D coordinates of the aiming device $P_0$ based on the three template angles $\alpha1$, $\alpha2$, $\alpha_3$ and the 3D coordinates of $P_1$, $P_2$, and $P_3$; and calculating heading, pitch and roll of the aiming device based on the 3D coordinates of $P_0$, $P_1$, and PAL-3D.

In certain embodiments, the computer executable code is further configured to display the aiming point of the aiming device.

In certain aspects, the present disclosure relates to a method for determining an aiming point of an aiming device and optionally determining 6DOF of the aiming device. In certain embodiments, the method includes the steps of:

capturing, by a first camera, a template image of an aimed object, wherein the aiming device is configured to aim toward the aimed object, the first camera is mounted on the aiming device, the aiming point is an intersection between a line of interest (LOI) of the aiming device and surface of the aimed object, a parallel auxiliary line (PAL) is a line that starts from optical center of the first camera and is parallel to the LOI, and the PAL is shown as a point (PAL-T) in the template image;

providing, by a computing device, a reference image of the aimed object, wherein the computing device is in communication with the first camera, and each point in the reference image has corresponding three dimensional coordinates in a 3D world coordinate system;

receiving, by the computing device, the template image from the first camera;

mapping, by the computing device, the template image to the reference image to obtain a mapping relation;

projecting, by the computing device, the PLR-T in the reference image using the mapping relation to obtain a reference point (PAL-R);

determining 3D coordinates PAL-3D of the PAL-R; and determining 3D coordinates of the aiming point based on the PAL-3D and a relationship between the LOI and the PAL.

In certain embodiments, the aiming device comprises a gun, a robotic device, and a range finder, the first camera is configured to take a template video comprising a plurality of the template images, and the method further comprises obtaining a track of the aiming points.

In certain embodiments, the reference image is captured by a second camera, and the second camera is mounted stationary in a location close to the aimed object.

In certain embodiments, the step of mapping comprises:

extracting template keypoints from the template image and constructing template keypoint descriptors for the template keypoints;

extracting reference keypoints from the reference image and constructing reference keypoint descriptors for the reference keypoints;

matching the template keypoints to the reference keypoints based on the template keypoint descriptors and reference keypoint descriptors to obtain matched keypoint pairs; and obtaining a homography transformation matrix between the template image and the reference image using the matched keypoint pairs.

In certain embodiments, the step of extracting the template keypoints or extracting the reference keypoints is performed using speeded up robust features (SURF), the SURF has a dynamic threshold, and the dynamic threshold for the template images is determined by:

extracting template keypoints from the template image using a current threshold;

determining if a number of the extracted template keypoints is in a range of [a, b], wherein a and b are positive integers, and b>a;

when the number of the extracted template keypoints is within the range of [a, b]: constructing template keypoint descriptors and keeps the current threshold;

when the number of the extracted template keypoints is less than a: reducing the threshold by Reduced Threshold=Current threshold/C, constructing the template keypoint descriptors, and using the reduced threshold for processing a next template image; and when the number of the extracted template keypoints is greater than b: increases the current threshold by Increased threshold=Current threshold×C, constructing the template keypoint descriptors, and using the increased threshold for the next template image, wherein C is a positive number in a range of 1.2-10.

In certain embodiments, the step of matching the template keypoints to the reference keypoints is performed using k-nearest neighbor (k-NN), and the matched keypoints by k-NN is determined by:

determining a first distance between each of the template keypoint to a nearest reference keypoint, determining a second distance between the template keypoint to a second nearest reference keypoint, and calculating a matching ratio of the template keypoint by dividing the first distance by the second distance;

ranking the template keypoints based on their matching ratios;

selecting a first number of template keypoints having smaller matching ratios; and forming the matched keypoint pairs using the first number of template keypoints and their matched reference keypoints, wherein the first number is a positive integer in a range of 50-500.

In certain embodiments, the step of obtaining the homography transformation matrix is performed by:

constructing a plurality of candidate homography transformation matrix models by progressive sample consensus (PROSAC) using different reprojection error thresholds; and selecting the candidate homography transformation matrix models having the lowest mean square error (MSE) as the homography transformation matrix.

In certain embodiments, the method further includes determining six degrees of freedom (6DOF) of the aiming device by:
  selecting three template points p1, p2 and p3 in the template image;
  calculating three template angles α1, α2, α3 based on distances between the three template points in the template image and a center of the template image;
  projecting the three template points p1, p2 and p3 in the template image to the reference image to obtain three reference points $pr_1$, $pr_2$, and $pr_3$, wherein the three reference points have three corresponding points $P_1$, $P_2$, and $P_3$, in the 3D world coordinates;
  calculating 3D coordinates of the aiming device $P_0$ based on the three template angles α1, α2, α3 and the 3D coordinates of $P_1$, $P_2$, $P_3$; and
  calculating heading, pitch and roll of the aiming device based on the 3D coordinates of $P_0$, $P_1$, and PAL-3D;

In certain embodiments, the method further includes displaying the aiming point of the aiming device.

In certain aspects, the present disclosure relates to a non-transitory computer readable medium storing computer executable code. The computer executable code, when executed at a processor of a computing device, is configured to perform the method described above.

In certain aspect, the present disclosure relates to a system for determining six degrees of freedom (6DOF) of an aiming device, In certain embodiments, the system includes:
  the aiming device configured to aim toward an aimed object;
  a first camera mounted on the aiming device, configured to capture a template image of the aimed object, wherein there is a line of interest (LOI) of the aiming device and a parallel auxiliary line (PAL) starting from optical center of the first camera and parallel to the LOI, and the PAL is shown as a point (PAL-T) in the template image; and
  a computing device in communication with the first camera, wherein the computing device comprises processor and a storage device storing computer executable code, and the computer executable code, when executed at the processor, is configured to:
    provide a reference image of the aimed object, wherein each point in the reference image has corresponding 3D coordinates in a 3D world coordinate system;
    receive the template image from the first camera;
    map the template image to the reference image to obtain a mapping relation;
    project the PAL-T in the template image to the reference image using the mapping relation to obtain a reference point (PAL-R);
    determine 3D coordinates PAL-3D of the PAL-R;
    select three template points $pt_1$, $pt_2$ and $pt_3$ in the template image;
    calculate three template angles α1, α2, α3 based on distances between the three template points in the template image and a center of the template image;
    project the three template points $pt_1$, $pt_2$ and $pt_3$ in the template image to the reference image to obtain three reference point $pr_1$, $pr_2$, and $pr_3$, wherein the three reference points have three corresponding points $P_1$, $P_2$, and $P_3$, in the 3D world coordinates;
    calculate 3D coordinates of the aiming device $P_0$ based on the three template angles α1, α2, α3 and the 3D coordinates of $P_1$, $P_2$, and $P_3$; and
    calculate heading, pitch and roll of the aiming device based on the 3D coordinates of $P_0$, $P_1$, and PAL-3D.

Kindly note that the LOI and the PAL in the above paragraph can be selected arbitrarily, and the LOI does not have to have a corresponding aiming point.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles disclosure. Wherever possible, the same reference numbers are used throughout the drawings to refer to the same or like elements of an embodiment.

FIG. 1A schematically depicts a line of sight and barrel line as possible lines of interest for a weapon according to certain embodiments of the present disclosure.

FIG. 1B schematically depicts the line of sight as Line of Interest (LOI) and the parallel auxiliary line (PAL) for a weapon according to certain embodiments of the present disclosure.

FIG. 3 shows the comparison between the present disclosure and the current approach used in the industrials from different points of view.

DETAILED DESCRIPTION

Figure 2:
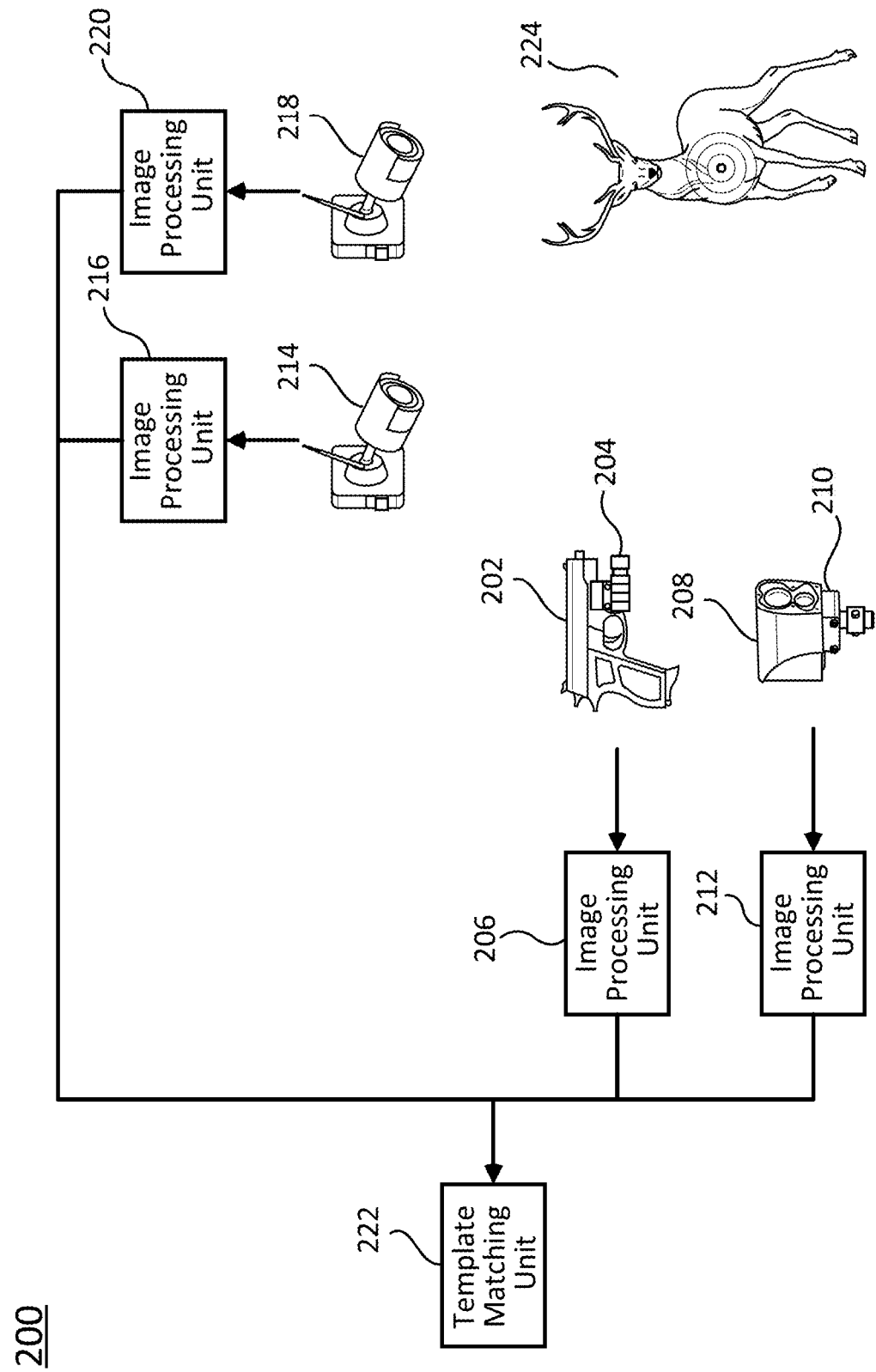
FIG. 2 schematically depicts a conceptual overview of a system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise, and "plurality" means two or more. As used herein, the terms "comprising", "including", "carrying", "having", "containing", "involving", and the like are to be understood to be open-ended, i.e., to mean including but not limited to. Moreover, titles or subtitles may be used in the specification for the convenience of a reader, which shall have no influence on the scope of the present disclosure.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

Further, to provide a more accurate and clear detailed description, a group of specific terminology is defined below. The terminology as well as the abbreviation will be used throughout the whole documentation with specific meanings.

Terms about Images.
1. Template image. In the disclosure, there is a camera installed and fixed on the aiming device. The camera is called template image camera or template imaging device. Normally the template image camera will point to the aimed object area, and images captured by the template image camera are called the template images.
2. Reference image. Image covering the aimed object and periphery area and used to match with the template images is termed the reference image. A reference image would be generated by a camera facing the aimed object, or generated by a computer image generation engine, or a frame extracted from a video sequence. The camera (reference imaging device) for taking the reference image is generally located near the aimed object and is stable, and is different from the template image camera which is installed on the aiming device and moves together with the aiming device.
3. Image metadata. The image metadata in this disclosure include:
   Image width (pixel).
   Image height (pixel).
   Image field of view.
   Angle for each image pixel, which is derived from relation between image pixel-image center pixel distance (unit pixel) and image pixel ray line-image center pixel ray line angle (unit degree).
   Parallel auxiliary line-template (PAL-T) point coordinate if the image is the template image (PAL-T will be defined in next section "terms about several types of point").

Relation between 2D reference image coordinate and 3D world coordinate (or 3D coordinate) if the image is the reference image.

Kindly note that the image metadata may only include the image width, the image height and the image field of view, and the angle for each image pixel, the PAL-T point coordinate, and the relation between the 2D reference image and the 3D world coordinate may be defined in another category. However, all the above data can be easily provided once to the system, and the 6DOF determination and aiming point determination can be performed using the same set of above data after setup of the system.

4. Image feature data. The image feature data in this disclosure include:
Timestamp: when the image was taken.
Number of keypoints.
Coordinate of each keypoint on 2D image coordinate.
Descriptors of each keypoints.

Terms about Lines.
1. Line of Interest (LOI). In any aiming device, there is always one or a couple of lines that play key roles in aiming device operation. For example, for a rifle weapon, the barrel line and line of sight (LOS) are considered as LOI. Throughout this document, without loss of generality and unless otherwise specified, the disclosure designates LOS as the LOI and the intersection between LOI and surface of aimed object as the Aiming Point. However, in other embodiments, LOI can be other lines of the aiming device, but the problem can still be solved with the methodology specified in the present disclosure.
2. Parallel Auxiliary Line (PAL) of the LOI. PAL is a ray line that starts from the template image eyepoint (optical center of the camera) and is parallel to the LOI. If there are multiple LOIs for a specific aiming device, then there will be multiple PALs. Because a PAL is the ray line from the eyepoint of the template image, on the template image, each PAL is a fixed point with constant coordinate value in 2D template image coordinate system.

Terms about Coordinate Systems.
1. 2D template image coordinate. The 2D template image coordinate is the coordinate system fixed on the template image, with pixel as the unit.
2. 2D reference image coordinate. The 2D reference image coordinate is the coordinate system fixed on the reference image, with pixel as the unit. There is a homography matrix H created by a template mapping method, which defines the relationship between the 2D template image coordinate and the 2D reference image coordinate.
3. 3D world coordinate with meter as the unit. The disclosure configures relationship between the 2D reference image coordinate and the 3D world coordinate in advance. This is based on the image projection principle, any point on the reference image represents a ray line in the 3D world, which starts from the image eyepoint (optical center of the reference camera). So for any point in the 2D reference image, we can always find its corresponding point in the 3D world. Different methods could be used to create the relation between the 2D image coordinates and the 3D world coordinates. In certain embodiments of the present disclosure, this relation is stored in reference image metadata.
4. Aiming device body coordinate system, with meter as the unit. This coordinate system is fixed on the aiming device, all geometrical relations among template camera location on the aiming device, device LOI, and offset between the LOI and PAL are defined and expressed in the aiming device body coordinate system.

Terms about Several Types of Points.
1. Aiming Point (AP). The aiming point is the intersection between the aiming device's LOI and the surface of the aimed object. This is a point in the 3D world coordinate. It may be mapped back to the 2D reference image coordinate, but may or may not be in the reference image since it may be out of the area covered by the 2D reference image. An aiming point belongs to a certain LOI. For some aiming devices, the LOI is not related to aiming, such as rifle barrel line. The present disclosure assumes that LOI is the LOS (unless otherwise stated), thus the intersection between the LOI and the aimed object surface is called the aiming point.
2. OCC Point. This point is the optical center of the camera.
3. PAL-T point. This point is the intersection of PAL and the 2D template image. Its coordination values in 2D template image coordinate are constant since the geometric relationship between the aiming device and the template camera is fixed. When the mechanical design drawing of the aiming device with template camera is available, PAL-T point location in the 2D template image could theoretically be calculated. However, because of mechanical parts manufacturing/installation inaccuracy, the actual position of PAL-T can only be obtained accurately through a specific calibration process. After calibration, the PAL-T point coordinate will not change in the 2D template image coordinate system.
4. PAL-R point. This is a PAL derived point on the 2D reference image coordinate system. It is the mapped point of the PAL-T point on the reference image using the homography matrix. Generally, it could NOT be viewed as the intersection between PAL and reference image, as there is no intersection between PAL and reference image.
5. PAL-3D point. This is a PAL-R derived point in the 3D world coordinate system. Because any point on the reference image will have a corresponding 3D world coordinate, the PAL-3D point can be obtained by mapping the PAL-R point in the reference image coordinate system into the 3D world coordinate system. The mapping can be done, for example, using a lookup table.

Six Degrees of Freedom (6DOF).
6DOF refers to the freedom of movement of a rigid body in three-dimensional space. Specifically, the body is free to change position as forward/backward (surge), up/down (heave), left/right (sway) translation in three perpendicular axes, combined with changes in orientation through rotation about three perpendicular axes, often termed yaw (normal axis), pitch (transverse axis), and roll (longitudinal axis). Please refer to the term "Six_degrees_of_freedom" in wikipedia.

The present disclosure relates to computer systems. As depicted in the drawings, computer components may include physical hardware components, which are shown as solid line blocks, and virtual software components, which are shown as dashed line blocks. One with ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

FIG. 1A shows an example of LOI in an aiming device. As shown in FIG. 1A, a weapon 102 has a barrel 104, a rear sight 106, and a front sight 108. The rear sight 106 and the front sight 108 are mounted or integrally fixed on the barrel 104. A barrel line 110 is a direct forward extension of the barrel 104. A trajectory 112 is the real path of a bullet from the weapon 102. A line of sight 114 is a viewing direction of a person's eye from the rear sight 106, through the front sight 108, and towards an aimed object 116. From the weapon function and operation point of view, there are two most important lines of interest (LOIs) when using the weapon 102 as an aiming device. The first LOI is the line of sight 114, which is a line through the rear and front sights (using iron sight) or a line through reticle in an aiming scope (using optical sight). This line leads the shooter to aim at the target. The second LOI is the weapon barrel axis line 110. In this disclosure, those types of lines are referred to as the LOIs. Kindly note that we use the LOS 114 as the LOI in determining aiming point and 6DOF of the aiming device in this disclosure unless otherwise specified, but we can select any line of the aiming device as the LOI. The intersection between the LOI and the surface of the aimed object is referred to as the device aiming point, even though the line is not used for aiming purpose, such as the barrel axis line.

FIG. 1B schematically depicts the aiming device with a template image camera to capture template images. Here, the weapon's line of sight 114 is the LOI. A camera 118 is mounted on the aiming device 102. Because the image captured by this camera 118 is used as the template image in template matching, the camera 118 is called a template image camera. $P_O$ is the location of the OCC of the camera 118; 120 is the camera lens axis; and 122/124 are the boundaries of the camera field of view. The camera mounting angle is purposely designed to guarantee that the LOI 114 of the aiming device is inside the camera field of view 122 and 124. In most cases, the LOI (LOS 114 here) is not parallel to the camera lens axis 120. But we can always define one (and only one) ray line that: (1) starts from $P_O$; (2) is inside camera field of view; and (3) is parallel to the LOI of the aiming device. As can be seen from FIG. 1B, 126 is this line and it is called Parallel Auxiliary Line (PAL) of the LOI 114. Because the camera 118 is solidly mounted on the aiming device body and its location and mounting angle are fixed, there is a fixed geometrical relationship between the PAL 126 and the LOI 114. Also because they are parallel in the 3D world, we can use two values ($f_x$ and $f_y$) in the aiming device body coordinate system to denote the offset of the two lines 114 and 126. Furthermore, because the PAL 126 is a ray line starting from the template image camera 118, the PAL 126 on the template image would be a point, and its location on the template image never changes, regardless of any movement of the aiming device.

FIG. 2 schematically depicts a conceptual overview of a system according to certain embodiments of the present disclosure, where the system can be used to detect aiming points of an aiming device on the aimed object surface and to determine the 6DOF location/attitude of the aiming device. As shown in FIG. 2, a system 200 includes one or multiple aiming devices. The aiming devices can be, for example, one or multiple weapons 202 or one or multiple range finders 208 or their combination. When the aiming device is the weapon 202, the weapon 202 is mounted with a camera 204, the camera 204 is in communication with an image processing unit 206, and the image processing unit 206 is configured to process images captured by the mounted camera 204. When the aiming device is the range finder 208, the range finder 208 is mounted with a camera 210, the camera 210 is in communication with an image processing unit 212, and the image processing unit 212 is configured to process images captured by the mounted camera 210. The image processing unit 206 or 212 is configured to process the images captured by the camera 204 or camera 210, the captured images are template images, and the output of the image processing unit 206 or the image processing unit 212 is the template image feature data. The template image feature data includes the timestamp of the template image, the number of template image keypoints, and coordinates and descriptor for each keypoint. The system further includes one or multiple cameras 214 and 218 and their respective image processing units 216 and 220. Cameras 214 and 218 are installed to cover the aimed object 224 as well as the background area. The number of cameras 214 and 218 depends on how large the area is and the image resolution required. There is no limitation to the number of cameras 214 and 218 theoretically. Cameras 214 and 218 are configured to capture images or videos of the aimed object 224 and the background area. In certain embodiments, the aimed object 224 may also be an image or a video displayed on a screen. In this case, the image or video data may be directly sent to the image processing units 216 and/or 220, and there is no need to have the cameras 214 and 218. The image processing unit 216 or 220 is configured to process the images captured by the camera 214 or 218, and the captured images are the reference images. The output of the image processing unit 216 and 220 is the reference image feature data having the same data format as the output of the image processing units 206 and 212. For the reference image, the 3D world coordinates of any pixel on the reference image are considered as known values, and the 2D pixel coordinates and 3D world coordinates correspondence may be predetermined and stored in the template matching unit 222. This is because cameras 214 and 218 are fixed relative to the aimed object areas, and camera location, orientation, and field of view are known. Any pixel on the reference image from the cameras 214 and 218 is a ray line starting from the OCC of the reference camera in the 3D world. In certain embodiments, the disclosure can define a virtual plane that is in front of the camera and perpendicular to the camera optical axis with a known distance to the camera. Then any pixel on the image will have a corresponding point on this plane. The 3D coordinates of the corresponding point on the plane could be considered as the 3D coordinates of the image pixel. The template matching unit 218 is configured to: (1) receive the image feature data; (2) process the received data to find the template and reference image feature data at the same timestamp; and (3)

find the mapping relationship between the template image and the reference image. The template image feature data and the reference image feature data at the same timestamp may be obtained in various ways. For example, the template image feature data may be sorted according to their timestamp, and the reference image feature data may also be sorted according to their timestamp. Then for each template image, the disclosure can find corresponding reference image feature data, where the timestamp of the template image feature data is the same as or is the closest to the timestamp of the corresponding reference image feature data. After that, the template feature data and the reference feature data with matched timestamps are used for image matching. In certain embodiments, the reference image feature data may also be interpolated, and each interpolated reference image feature data may have a linear relationship from its two neighboring reference image feature data. This way, each template information can be matched with the reference information at the same timestamp, such that the image matching can be more accurate. By mapping the template image to the reference image, certain points, such as the PAL-T point on the template image, can be mapped to the PAL-R point on the reference image. When multiple template images are collected from the same aiming device, there are also multiple PAL-R points on the reference images, which form a track on the reference image. The track reflects the movement of the aiming device 202 or the aiming device 208 in a period and can be used for training the person who operates the aiming device 202 or the aiming device 208.

Because each pixel in the reference image is related to its 3D world coordinates after mapping relationship is established between the template image and the reference image, a certain point on the template image will correspond to a point on the reference image, and consequently correspond to a 3D world coordinate. After multiple points (at least three) in the template image are mapped to the reference image as well as to the 3D world coordinates, since the geometrical relationship of the these points on the template image relative to the corresponding camera (aiming device) is known, based on the 3D world coordinates of these three points, the 6DOF measurement values of the aiming device 202 or the aiming device 208 in the 3D world coordinate can also be determined.

When a user operates the aiming device 202 or the aiming device 208 to aim at the aimed object 224, his/her aiming action is reflected by the aiming points and the 6DOF of the aiming devices. The aiming points of an aiming device, the 6DOFs of the aiming device, as well as the moving track of the aiming points are very useful in industrial and engineering applications. For example, if the aiming device is a weapon, weapon aiming point track and aiming point at weapon firing moment could be used to train the shooter's aiming skills, to evaluate weapon's performance, etc. In certain embodiments, the number of aiming devices 202 and/or 208 (with mounted cameras 204 and 210) is m, and the number of cameras 214 and 218 is n, where both m and n are positive integers. There is no upper limit on m and n theoretically, as long as the template matching unit can handle the information obtained from the image processing units 206, 212, 216, and 220.

In certain embodiments, to achieve the design objectives of (1) detecting aiming points of an aiming device on the surface of an aimed object, and (2) determining 6DOF location/attitude of the aiming device, the system 200 shown in FIG. 2 at least has the following novel designs: (1) first, the aiming device is mounted with a video camera, and this camera mounted on the aiming device will provide the image including device's LOI (such as the line of sight for a gun) in the field of view. (2) Second, the reference image could be generated in any possible way. In certain embodiments, the reference image is a stationary digital picture. In certain embodiments, a stationary video camera is installed, and the reference image is a real-time image of the aimed object. In certain embodiments, the aimed object area itself may be a specific frame from a video clip at a certain moment. In certain embodiment, the reference image may be generated by a computer graphics engine. (3) Third, the present disclosure uses a computer vision algorithm to find a matching relationship from the template image to the reference image. (4) Fourth, once the relationship is determined, a particular point on the template image could be mapped to a point on the reference image. When the PAL-T point on the template image is selected to be mapped to the reference image, the mapped point on the reference image is the PAL-R. Here PAL-T point is a specific point on the template image. The ray line from the OCC of the template camera and parallels the LOI goes through this point on the template image. Furthermore, the PAL-R point in the 2D reference image is converted to the 3D world coordinate, noted as PAL-3D. Until now the PAL line in the 3D world is found. (5) Fifth, because the PAL line that parallels to the LOI and the offset between the PAL and the LOI is known, the LOI can be found by applying the offset to the PAL line. Then the aiming point of the aiming device can be found, which is the intersection between the surface of the aimed area and the known LOI. (6) Sixth, if there are multiple (three or more) ray lines that are defined on the aiming device and geometric relationship (such as angle offsets) between the ray lines is well known, the disclosure can repeat the above "Fourth" process to find multiple points similar to the PAL-3D on the 3D world coordinate. Because geometric angle relationship among ray lines on aiming device should be the same on 3D world coordinate system, the disclosure could use this hint to find the aiming device's 3D world coordinate (x, y, z) and three attitude angles (heading, pitch and roll), which represent 6DOF information of the aiming device. Kindly note that the disclosure is not limited to finding the aiming points of the aiming device, but can be used to identify any LOI of the aiming device in the 3D world, as long as the LOI is parallel to one ray line in the field of view of the template image.

FIG. 3 shows comparison between the present disclosure and current approaches used in the industry from different points of views. Aiming point detection is the most fundamental function of most aiming devices. The most important performance metrics of aiming point detection is accuracy. The accuracy from the optics-based approach is higher than the inertia sensor and "indoor GPS" approach by about one or two orders of magnitudes. The accuracy of the present disclosure is similar to that of the optics-based approach. Therefore, the disclosure only discusses the advantages/disadvantages of the present disclosure in comparison with optics-based approach, especially with the laser-based approach.

The accuracy of the present disclosure is comparable to the high accuracy optics-based approach. Although the best laser-based application may have a slightly higher accuracy, the present disclosure has the following two advantages over the optics-based approach. First, the current accuracy of the laser-based approach is obtained when the distance between the aiming device and the aimed object is in a range of six to ten meters. When the distance increases, the laser spot on the aimed object will be larger; and laser spot brightness will reduce. As the result, detecting accuracy will deteriorate. Now a lot of engineering application systems expect much greater distance, where the present disclosure will outperform the laser-based systems. Using the present disclosure, as long as a proper zoom lens is used, the resolution of the template images will always be good enough on the surface of the aimed object no matter how far the distance is. Second, the present disclosure works in the same visible light spectrum as human vision systems. In contrast, the laser-based system uses invisible light, which is different from the human visible light. The optics instrument in the system have different refraction on the invisible light and visible light. The different refractions between invisible laser and human eye visible light will create error in the laser-based system. But the present disclosure does not have this problem.

Further, the present disclosure supports unlimited aiming points from one aiming device in the field of view of the aiming device camera. In contrast, the laser-based device only provides one aiming point per laser beam. Using the laser-based approach, if an engineering application needs more than one interesting points, such as barrel line point on the aimed object plane in addition to the line of sight aiming point on the aimed object plane, the barrel line point could be only "guessed" under a certain logical assumption. The logical assumption, for example, can be that the aimed object surface is flat and perpendicular to the aiming device laser beam, and that there is a linear relationship between offset distance and angle, etc. In contrast, the present disclosure supports an one to one mapping without any assumption in the whole field of view. For example, the aiming point and the barrel line point on the aimed object plane can be determined independently.

Furthermore, the present disclosure supports unlimited number of aiming devices that can work simultaneously. As the number of devices increases, the system complexity follows an arithmetical ratio. But the laser-based system needs to use specific methods to handle situations in multiple aiming device scenario, for example, how to identify which laser spot belong to which aiming device, how to handle multiple laser spots overlapped with each other; and because of that, the complexity of the laser-based system increases exponentially. As the result, the large number of aiming devices case is infeasible in the laser-based system. This imposes a big engineering limitation.

Furthermore, the present disclosure supports unlimited aimed object area. For both the disclosure and the laser-based approaches, the aimed area needs to be covered by camera field-of-view. In the present disclosure approach, this camera provides reference image. In the laser-based approach, this camera detects the laser spot location on aiming area. Regardless which approach is used, if the field of view (or resolution of one camera) is not big or high enough, multiple cameras have to be used. As with the case of multiple aiming devices, the system complexity for multiple cameras in the present disclosure increases linearly, but the complexity of the laser-based system increases exponentially. The key reason behind this is that for a laser-based approach, laser generation and camera laser detection have to be coupled or synced in implementation, namely requiring the camera not only to detect laser spots, but also to determine the aiming device each of the laser spots came from. But for the present disclosure, the template image from the template camera and the reference image (maybe from the reference camera) are purely independent from each other. In the multiple reference images case, the disclosure only needs the software to map the template image to the multiple reference images, and find the best matched reference image.

Furthermore, the laser-based approach works only in indoor and dark environment. Because the sunlight is so strong and the wavelength spectrum is so rich, it is not easy to identify an aiming device laser spot from ambient sunlight. A workaround is to use strong laser lights. However, strength of the laser lights is normally restricted by laser radiation safety laws to avoid eye injury. The present disclosure does not have this limitation.

Moreover, hardware of the present disclosure is simple, with only multiple normal visible light digital cameras with standard USB or internet connection. The laser-based system infrastructure needs a laser generator, as well as a supporting power and control logic system, and the cameras need filters for specific laser wavelength to pass through.

Overall, the infrastructure of the present disclosure is much simpler than that of the laser-based approach in terms of both hardware and software. All hardware/software components to sync multiple lasers and cameras are removed, which are very heavily used in the current laser-based approach. The implementation cost is significantly reduced with the present disclosure.

In addition, the laser-based approach does not provide the functionality of aiming device 6DOF (location/attitude) detection. The extra approaches which may provide 6DOF information are either very expensive or with a large detection error and a long delay. The present disclosure provides a simpler/cheaper but more accurate approach. The disclosure's major function is for high accuracy aiming point detection. But the disclosure could detect multiple points on the aimed object surface. Once multiple points are determined, the relation between the angle offset in the aiming device and those points' location data could be used to figure out the location and attitude of the camera installed on the aiming device. In summary, the present disclosure is cheaper in the situation requiring both aiming point detection and location/attitude information, and the present disclosure achieves the same or better accuracy than other approaches.

Figure 4:
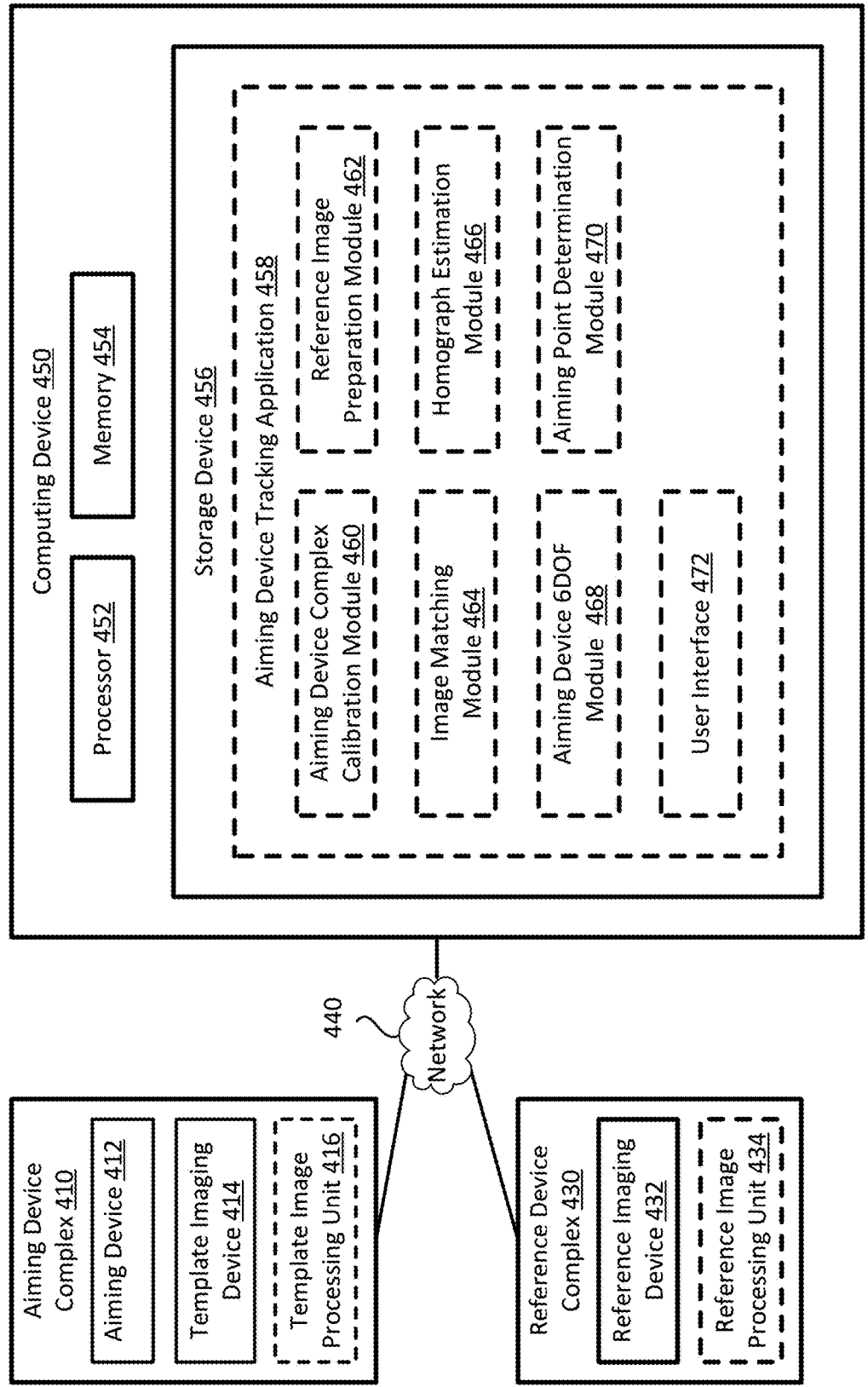
FIG. 4 schematically depicts an implementation of a system for aiming points detection and aiming device 6DOF estimation according to certain embodiments of the present disclosure.

FIG. 4 schematically depicts an implementation of a system for aiming points detection and aiming device 6DOF estimation according to certain embodiments of the present disclosure. As shown in FIG. 4, a system 400 includes an aiming device complex 410, a reference device complex 430, a network 440, and a computing device 450. The computing device 450 is in communication with the aiming device complex 410 and the reference device complex 430 via the network 440. The aiming device complex 410 has an original aiming device 412, a template imaging device 414, and a template image processing unit 416. The reference device complex 430 has a reference imaging device 432 and a reference image processing unit 434.

The number of the aiming device complexes 410 may be one or multiple, depending on the application requirement. Each aiming device complexes 410 has one aiming device 412, one template imaging device 414, and one template image processing unit 416. The aiming device complex 410 is a combination of the aiming device 412 requiring an aiming function (such as a weapon or a rangefinder), the template imaging device 414 (such as a camera), and the template image processing unit 416. In certain embodiments, the present disclosure supports m number of aiming devices complexes 410, where m is a positive integer. The number m is not limited, which depends only on hardware capability. The template imaging device 414 is mounted on or integrated with the aiming device 412.

The template imaging device 414 may be a red, green, and blue (RGB) or YUV based color camera, a grayscale camera, an RGB depth (RGBD) camera, or another type of digital or analog camera, or visual sensor, which is configured to capture images or videos. During the aiming process of a user, the aiming device 412 moves to aim at the aimed object, and the template imaging device 414 is also moved synchronously to capture template images of the aimed object and the surrounding area. In other words, the images captured by the template imaging device 414, either visible or invisible, analog or digital, cover the aimed object or/and surrounding area. The captured real-time images or video by the template imaging device 414 are outputted to the template image processing unit 416.

The image processing unit 416 is an implementation of general hardware and specific software. Depending on the system architecture design, it has various implementation approaches. In certain embodiments, the image processing unit 416 may be a small-size single-board computer (SBC) with central processing unit (CPU) and/or graphic processing unit (GPU), and image processing software runs on it. In other embodiments, multiple image processing units 416 are integrated with one or a group of powerful computers with multiple cores, multiple processes, or a single process with multiple image processing threads running on it. The template image processing unit 416 is configured to, upon receiving the images/video signal from the template imaging device 414, convert the content to standard image data if the raw input is not standard. After the standard image data is available, the template image processing unit 416 is further configured to use a specific image processing algorithm to find the keypoints (also known as feature points) in the images and the corresponding description (also known as a descriptor) for each keypoint. The timestamp, the number of keypoints, the keypoints coordinates, and the keypoint descriptors are combined as template image feature data, and the template image processing unit 416 is further configured to send the template image feature data to the computing device 450. The format of the timestamp varies and may represent an accurate time (in millisecond or CPU clock tick count number), and the keypoints may be in the form of ($K_x$, $K_y$, F), where $K_x$ and $K_y$ are coordinates of a keypoint in the 2D template image coordinate, and F is the descriptor or vector representing features of the keypoint. An exemplary template image feature data can include a timestamp of 1614823076, and k number of keypoints (2, 6, $f_1$), (7, 18, $f_2$), ..., (636, 479, $f_k$).

Image registration algorithms are used in the template image processing unit 416 and the reference image processing unit 434. In certain embodiments, the image processing units 416 and 434 are configured to perform keypoint extraction and keypoint descriptor construction using Speeded Up Robust Features (SURF). In certain embodiments, the image processing units 416 and 434 may also use Scale-Invariant Feature Transform (SIFT) or other types of feature detector to extract keypoints and/or construct keypoint descriptors. In certain embodiments, keypoints extraction and descriptor construction are achieved using deep learning neural networks. In certain embodiments, homography matrix from template image to reference image is established directly using deep learning neural networks, and keypoint extraction and descriptor construction steps are skipped. In certain embodiments, a threshold needs to be set to control the number of extracted keypoints.

Figure 5:
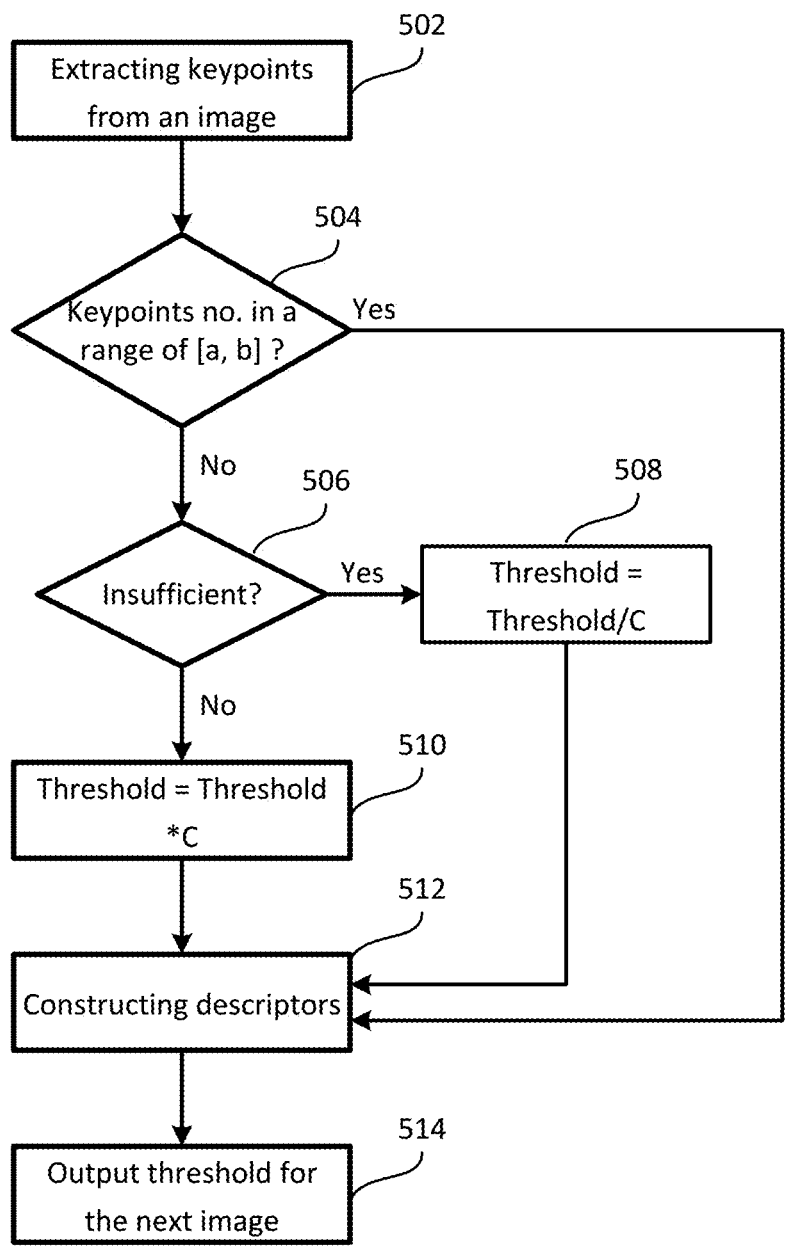
FIG. 5 schematically depicts a process of updating the threshold for detecting keypoints in template/reference images according to certain embodiments of the present disclosure.

FIG. 5 schematically depicts a process of updating a SURF threshold for detecting keypoints in a sequence of template images or one or multiple reference images according to certain embodiments of the present disclosure. In certain embodiments, the process 500 is performed by the template image processing unit 416 or the reference image processing unit 434. It should be particularly noted that, unless otherwise stated in the present disclosure, the steps of the process 500 may be arranged in a different sequential order, and are thus not limited to the sequential order as shown in FIG. 5. In certain embodiments, the process 500 defines an initial threshold and a range of keypoint number [a, b] from a lower bound a to an upper bound b, where a and b are positive integers, and b>a. The initial threshold and the range of keypoint number may be determined based on the complexity of the images, and the hardware of the template image processing unit 416 and/or the reference image processing unit 434. In certain embodiments, a is a positive integer in the range of 50-500, b is a positive integer in the range of 100-1000, and the initial threshold is a Hessian threshold in the range of 50-800. In an example, the value of a, b, and the initial threshold are respectively 200, 400, and 250. At procedure 502, the method extracts keypoints from the current template/reference image using the initial threshold. At procedure 504, if the number of extracted keypoints is in the range of [a, b], the process proceeds to procedure 512 to construct descriptors for the extracted keypoints, and keeps the threshold unchanged at procedure 514. If the number of extracted keypoints number is out of the range of [a, b], the process proceeds to procedure 506. At procedure 506, if the number of extracted keypoints number is less than the lower bound a of the predefined range, the process proceeds to procedure 508, where the threshold is reduced, the descriptors of the extracted keypoints are constructed at procedure 512, and the reduced threshold is outputted at procedure 514 as the threshold for the next template or reference image. If it is determined at procedure 506 that the number of extracted keypoints is greater than the upper bound b of the predefined range, the process proceeds to procedure 510, where the threshold is increased. Then at procedure 512, the process constructs descriptors for the keypoints, where the number of keypoints is more than b. After that, at procedure 514, the algorithm outputs the increased threshold for processing the next template or reference image. Kindly note that variations of the procedures are available without departing from the concept of the method 500. For example, the procedure 510 can go back to the procedure 502 to extract keypoints again using the current template image (could also be current reference image) with the increased threshold, and the procedure 508 can go back to the procedure 502 to extract keypoints again using the current template image (could also be current reference image) with the decreased threshold. In certain embodiments, after procedure 510, the process may also choose the top b number of keypoints that are most reliable and construct descriptors for the top b number of keypoints. In summary, the outputted threshold at procedure 514 for processing the next template image could be the unchanged threshold, the reduced threshold, or the increased threshold according to the number of extracted keypoints and the range of [a, b].

Kindly note that the threshold reduction at procedure 508 is performed by Threshold=Threshold/C, and the threshold increase at procedure 510 is performed by Threshold=Threshold*C. In the above equations, C is a constant as an adjustment factor. In certain embodiments, the value of C is in the range of 1-10. In certain embodiments, C is in the range of 1.2-3. In one embodiment, C is 1.5.

Referring back to FIG. 4, the reference device complex 430 includes the reference imaging device 432 and the corresponding reference image processing unit 434. The reference imaging device 432 is configured to capture a reference image or a video of the aimed object area and send the reference image or video to the reference image processing unit 434. The reference imaging device 432 may be an RGB camera, a grayscale camera, an RGBD camera, or any other types of visual sensors. The number of reference imaging device 432 is not limited, which depends only on hardware capability. In certain embodiments, the number of the reference imaging device 432 is in a range of 1-10. Any point on the image from the reference imaging device 432 is considered as a known point in the 3D world coordinate system. To get the mapping information between the 2D reference image coordinates and the 3D world coordinates, there are a variety of implementation methods. For example, several known points in the 3D environment may be tagged, and the 3D coordinates corresponding to each pixel in the reference image can be derived from the 3D coordinates of the tagged points.

The reference imaging device 432 may be of different types. In certain embodiment, a typical reference imaging device 432 is an RGB camera, whose location is stationary in the 3D world. The camera faces the aimed object area, collects real-time aimed object area image or images, and sends the image or images to the reference image processing unit 434.

In certain embodiments, the reference imaging device 432 is a media player, the media player 432 is configured to display a video clip on a screen that is installed in a static location in the 3D world coordinates. The 3D coordinates of the screen can be measured. Therefore, when the video images are displayed on the screen, each pixel in the video image has its corresponding 3D coordinates. Under this situation, the reference image device 432 does not need to capture images. Instead, it displays each video image on the screen and sends the same video image to the reference image processing unit 434.

In certain embodiments, the reference image device 432 is a serial of dynamic images generated by the computer graphics engine. In this case, the same as the media player, while each dynamic image is sent to a projector to show on the static screen, it is also sent to the reference image processing unit 434. Also, in this case, the relation from the 2D image to the 3D world could dynamically change, which provides more broad potential for the applications.

In certain embodiments, the reference imaging device 432 is a pre-taken stationary image of the aimed object area without change. In this case, the stationary image is just sent to the reference image processing unit 434 directly.

The reference imaging processing unit 434 is substantially the same as the template imaging processing unit 416. The above description of template image processing unit 416 could apply to the reference image processing unit 434 except that the outputted data from the reference image processing unit 434 is marked as the reference image feature data. In certain embodiments, the reference image processing unit 434 and the template image processing unit 416 have the same implementation (hardware and software), but they respectively run different instances of the image processing unit.

Both the template imaging device 414 and the reference imaging device 432 provide images. But the images from different imaging devices 414 and 432 may have different image metadata, such as resolution (image width and height in pixels), and the field of view. For each template imaging device 414, the image metadata include image width, image height, image field of view, the angles for each image pixel, and specific PAL-T point coordinates (in pixels). For each reference imaging device 432, the image metadata include image width, image height, image field of view, 2D image pixels to 3D world coordinates mapping, for example in the form of a look up table. In certain embodiments, most of the image metadata is one time loaded into the system because they do not change during the operation of the system.

Logically the single or multiple template imaging processing units 416, single or multiple reference imaging processing units 434, and the computer device 450 are different entities. They are connected by the network 440. But in certain embodiments, the template and reference imaging processing units 416 and 434 may also be part of the computing device 450, from the hardware configuration point of view. In this case, the image processing units are software components running on the computer device 450. On whatever hardware configuration, there is no need to transfer the original images from the aiming device complex 410 or the reference device complex 430 to the computing device 450 via the network 440, only image feature data outputted by the processing units 416 and 434 need to be transmitted to the computing device 450 via the network 440. In this way, the amount of data to be transmitted, and thus transmission delay will be minimized.

In certain embodiments, the template image processing unit 416 may be installed on or be integrally formed with the template imaging device 414 or/and the aiming device 412. The communication between the template image processing unit 416 and the template imaging device 414 is preferably implemented by cable, USB or other hardware interface instead of wireless connection. With the wired connection, the communication is efficient. Similarly, the reference image processing unit 434 may be installed on or integrally formed with the reference imaging device 432, and the reference image processing unit 434 may be linked with the reference imaging device 432 via wired connection. With this type of design, the workload of data transfer via the network 440 is greatly reduced, and the system 400 can support a large number of aiming devices 412 and reference imaging devices 432.

The network 440 may be wired or wireless and may be of various forms. Examples of the networks may include, but are not limited to, a local area network (LAN), WiFi, a wide area network (WAN) including the Internet, 4G/5G networks, or any other type of network. In certain embodiments, the network 440 may be an interface such as a system interface or a USB interface other than a network, or any other types of interfaces to communicatively connect the image processing units 416 and 434 and the computing device 450. In certain embodiments, because image feature data have high volumes in general, specific methodologies and structures are designed to reduce network bandwidth consumption.

The computing device 450 may be a server computing device, a cluster, a cloud computer, a general-purpose computer, a specialized computer, or any computing device that can do the work. In certain embodiments, the computing device 450 is a server of a training center that uses aiming devices, which is configured to track the movement of each aiming device used by a trainee during the training and display the tracking history to a trainer or instructor. As shown in FIG. 4, the computing device 450 may include, without being limited to, a processor 452, a memory 454, and a storage device 456. In certain embodiments, the computing device 450 may include other hardware components and software components (not shown in FIG. 4) to perform its corresponding tasks. Examples of these hardware and software components may include but are not limited to, other required memory, interfaces, buses, Input/Output (I/O) modules or devices, network interfaces, calibration module, and peripheral devices. The processor 452 may be a central processing unit (CPU) that is configured to control the operation of the computing device 450. The processor 452 can run an operating system (OS) or other applications of the computing device 450. In certain embodiments, the computing device 450 may have more than one CPU as the processor, such as two CPUs, four CPUs, eight CPUs, or any suitable number of CPUs. The memory 454 can be a volatile memory, such as the random-access memory (RAM), for storing the data and information during the operation of the computing device 450. In certain embodiments, the memory 454 may be a volatile memory array. In certain embodiments, the computing device 450 may run on more than one memory 454. The storage device 456 is a non-volatile data storage media for storing the OS (not shown) and other applications of the computing device 450. Examples of the storage device 456 may include non-volatile memory such as flash memory, memory cards, USB drives, hard drives, floppy disks, optical drives, solid-state drive (SSD), or any other types of data storage devices. In certain embodiments, the storage device 456 may be local storage, remote storage, or cloud storage. In certain embodiments, the computing device 450 may have multiple storage devices 456, which may be identical storage devices or different types of storage devices, and the applications of the computing device 450 may be stored in one or multiple storage devices 456 of the computing device 450. In certain embodiments, the computing device 450 is a cloud computer, and the processor 452, the memory 454, and the storage device 456 are shared resources provided on-demand over the Internet.

The aiming device tracking application 458 runs on the computing device 450. The aiming device tracking application 458 is configured to:

Receive template and reference image feature data.

Establish the relationship between the template images and the reference images. Based on the mapping relationship, a point on the template image could have a mapping point on the corresponding reference image.

Find PAL-R point of each aiming device on the reference image and convert it to the 3D world coordinate PAL-3D point.

From PAL-3D point to find the aiming point in the 3D world coordinate, which corresponds to the LOI of the aiming device.

Find the aiming device's 6DOF information.

As shown in FIG. 4, the aiming device tracking application 458 includes an aiming device complex calibration module 460 that calibrates the template imaging device 414 and determines the PAL-T coordinates in the template images; a reference image preparation module 462 that builds the relationship between the 2D reference image and the 3D world coordinates; an image matching module 464 that builds the mapping relationship between m template images and n reference images; a homography estimation module 466 that provides the algorithm used for image matching; an aiming device 6DOF module 468 that provides calculation of aiming device's 6DOF information; an aiming point determination module 470 that provides the calculation to map a point on the template image to a point in the reference image as well as to the 3D world coordinate, where if the point is PAL-T point, the mapped PAL-3D point will transfer to the aiming point via an offset; and a user interface 472 that is an interface to control and monitor application operation and show the application result.

Figure 6A:
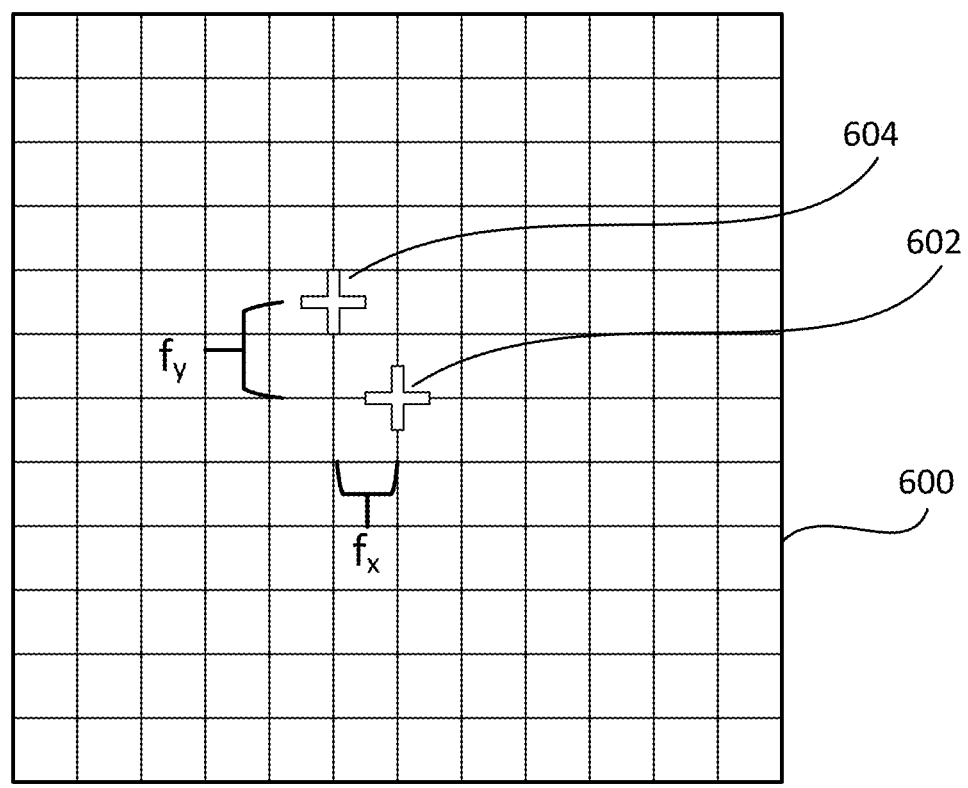
FIG. 6A schematically depicts a paper with line graph showing a center of a target and a parallel auxiliary line (PAL) point according to certain embodiments of the present disclosure.
Figure 6B:
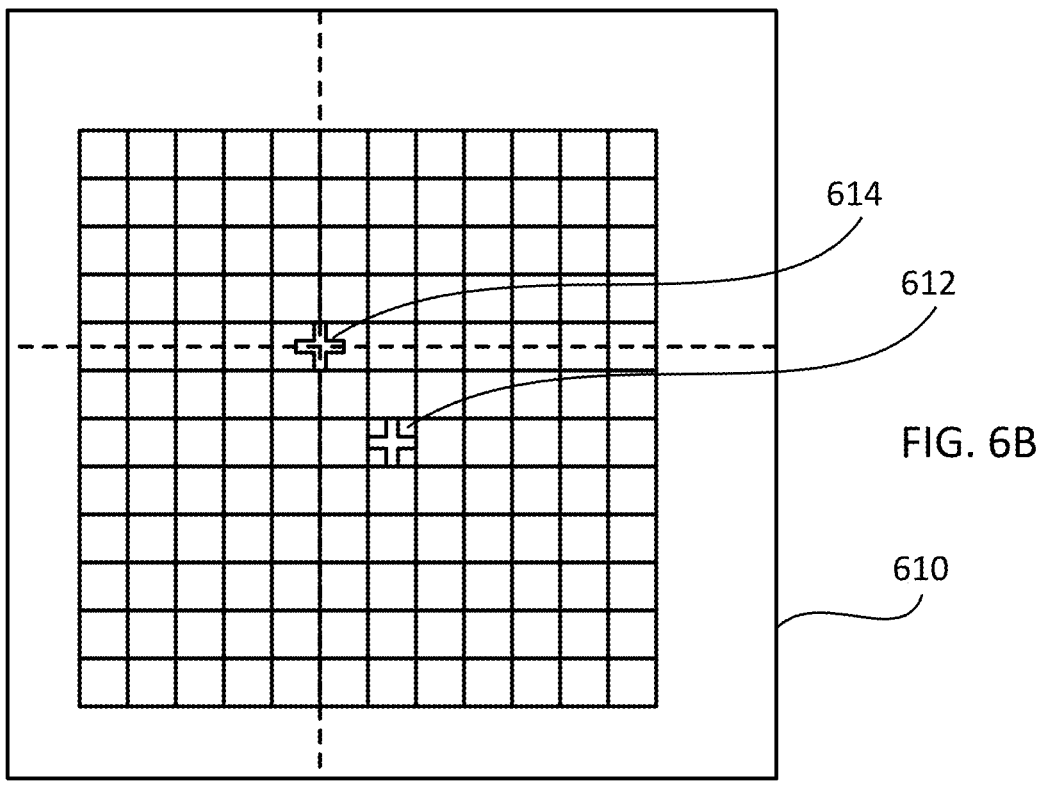
FIG. 6B schematically depicts a template image of the paper of FIG. 6A according to certain embodiments of the present disclosure, where a distance between the template imaging device and the paper is small.
Figure 6C:
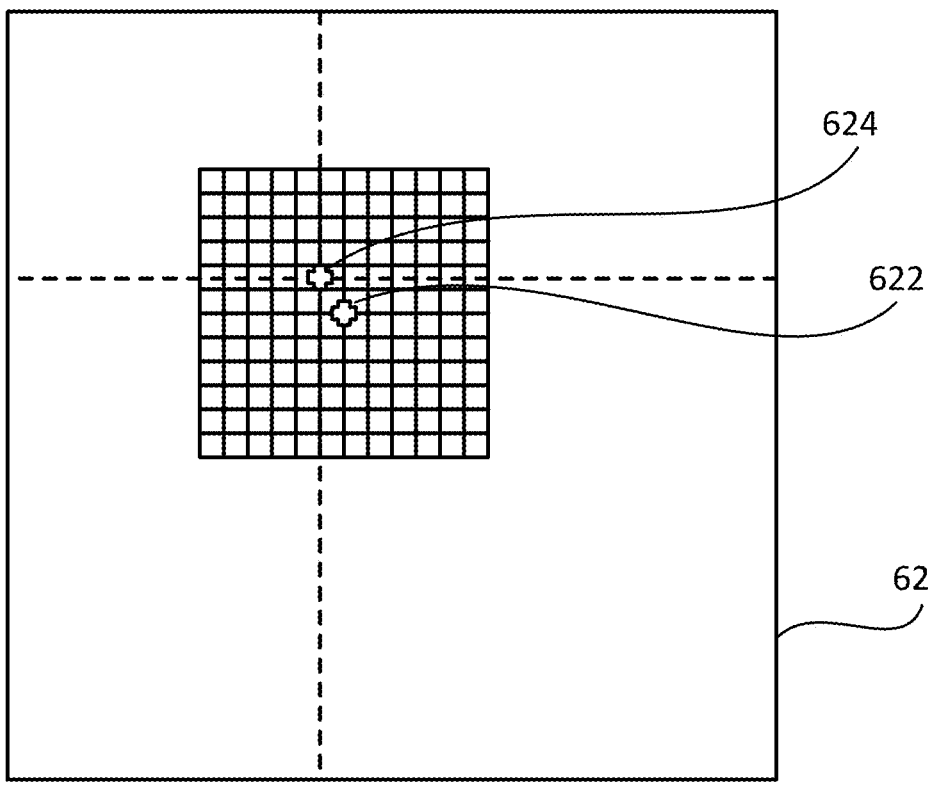
FIG. 6C schematically depicts a template image of the paper of FIG. 6A according to certain embodiments of the present disclosure, where a distance between the template imaging device and the paper is large.

The aiming device complex calibration module 460 is configured to calibrate the template imaging device 414 installed on the aiming device 412, obtain image metadata of the template images, and store the image metadata in the storage device 456, such that the template image metadata is available to the aiming device 6DOF module 468 and the aiming point determination module 470. The purpose of calibration is to locate the accurate location of PAL-T in the template image, and the calibration can be performed by various ways. FIGS. 6A-6C schematically illustrate a way of calibration. As shown in FIG. 6A, a target 600 is provided, which is a flat paper with lined graph. The lined graph has a center 602 indicated by a cross, and a PAL point 604 is also drawn as a cross on the lined graph 600. Referring back to FIG. 1B, during the manufacturing of the weapon 102 and the template camera 118, the parameter ($f_x$ and $f_y$) is provided to indicate the offset between the LOI 114 and the PAL 126. Here in FIG. 6A, the center 602 corresponds to the intersection between the LOI 114 with the target 600, and the PAL point 604 corresponds to the intersection between the PAL 126 and the target 600. Therefore, the PAL point 604 can be determined by moving the values of ($f_x$ and $f_y$) from the center 602. The target 600 is placed on a flat vertical surface, the weapon 102 is fixed on a fixture, and is aimed at the target 600. The weapon 102 is placed at a first distance from the target 600, the LOI is aimed toward the center 602, and an image 610 is taken by the template camera 118 and shown in FIG. 6B. Then the weapon 102 is placed at a second distance from the target 600, the LOI is aimed toward the center 602, and an image 620 is taken by the template camera 118 and shown in FIG. 6C. The first distance may be, for example 5 meters, and the second distance may be, for example 10 meters, but the distances are not limited to the exemplary values. The center 602 is shown as the center 612 and the center 622 in the images 610 and 622, and the PAL point 604 is shown as the points 614 and 624 in the images 610 and 622. Because the parameter ($f_x$ and $f_y$) has a high accuracy due to the manufacture accuracy, the points 614 and 624 are assumed the PAL-T point and thus have the same pixel coordinates in the two images 610 and 620. Assume the point 614 has a pixel coordinates ($x_1$, $y_1$) and the point 624 has a pixel coordinates ($x_2$, $y_2$), the PAL-T point coordinates ($x_t$, $y_t$) is calculated as (($x_1+x_2$)/2, ($y_1+y_2$)/2). After calibration, the aiming device complex calibration module 460 is further configured to store the template image metadata in the storage device 456. The template image metadata include template image width, image height, image field of view, angles, and PAL-T coordinates ($x_t$, $y_t$). For example, the template image width/height could be 1920× 1080, 800×800 or any other suitable values; the image field of views could be 10-180 degrees, preferably 25-110 degrees, and more preferably around 60 degrees; the angle for each image pixel could be a relation as shown in FIG. 8B, where each pixel in the template image has a corresponding view angle; and the PAL-T is a pixel coordinates, such as (397, 389) in a 800×800 image. After the calibration and the storage of the template image metadata in the storage device 456, the aiming device tracking application 458 can use the image metadata for template device 6DOF determination and aiming point determination, and there is no need for the aiming device complex 410 to have the template image metadata. In certain embodiments, the aiming device complex 410 may also store a copy of the template image metadata, which can be used with computing devices other than the computing device 450, and the other computing devices can retrieve the image metadata from the aiming device complex 410 when needed. In certain embodiments, one of the template images 610 or 620 is enough to determine the template image metadata at a sufficient high resolution. In other words, the pixel coordinates $(x_1, y_1)$ or the pixel coordinates $(x_2, y_2)$ can be used directly as the PAL-T coordinates in the template image. In certain embodiments, the calibration of the template image is performed independently from the computing device 450, and the obtained template image metadata is accessible by the computing device 450.

The reference image preparation module 462 is configured to determine 3D world coordinates (3D coordinates) for each pixel in the reference image, obtain image metadata of the reference image, and store the reference image metadata in the storage device 456, such that the reference image metadata is available to the aiming device 6DOF module 468 and the aiming point determination module 470. In certain embodiments, the reference image may be a standard image having a resolution of such as 640×480 pixels, and each pixel in the reference image has its pixel coordinates and its corresponding 3D coordinates. The 3D coordinates may be predefined by the method of using location measurable tags or predefined by measuring the 3D location of the screen displaying the reference images. As described above, the reference imaging device 432 may be installed stationary at the location close to the aimed object. Thus, the 3D coordinates of the reference imaging device 432 in the 3D world coordinate system are known. In certain embodiments, the environment in the field of view of the reference imaging device 432 is attached with several tags at predefined locations, and the 3D coordinates of the pixels in the reference image can be derived from the locations of the tags. In certain embodiments, there are a few reference imaging devices 432, each of the reference imaging devices 432 takes a reference image from a different view angle of the aimed object area, and this group of reference images taken by the group of reference imaging devices 432 can be used together to accurately determine the 3D coordinates of the pixels in the reference images. In certain embodiments, the reference image preparation module 462 may have a 3D reconstruction function to build a 3D model of the aimed object. Instead of using the tags, the reference image preparation module 462 may reconstruct the 3D model using the multiple 2D reference images. Accordingly, based on the 3D coordinates of the 3D model, and the 2D reference image-3D model correspondence, the reference image preparation module 462 can determine the 3D coordinates of each pixel in the 2D reference images. In certain embodiments, the reference image preparation module 462 may have the 3D coordinates of the screen, and provide the 3D coordinates of the pixels in the reference images based on the reference image-screen correspondence. Kindly note that the reference image preparation module 462 may need the reference images, for example, to construct the 3D model, but the reference image preparation module 462 may not need the reference images when it is the media player. The 2D reference image coordinates-3D world coordinates information may be in the form of $(P_x, P_y)-(X, Y, Z)$, where $P_x$ and $P_y$ are pixel coordinates along the horizontal direction and vertical direction of the 2D reference image, and $(X, Y, Z)$ are 3D world coordinates corresponding to the pixel. An exemplary result can be (0, 0)-(12.11, 17.68, 67.34), (0, 1)-(12.12, 17.69, 67.33), . . . , (640, 480)-(123.81, 78.66, 112.87). After preparation, the reference image preparation module 462 is further configured to store the reference image metadata in the storage device 456. The reference image metadata include reference image width, image height, image field of view (optional), and 2D reference image pixel-3D world coordinates relationship. There is no need for the reference device complex 430 to have the reference image metadata. In certain embodiments, the reference device complex 430 may also store a copy of the reference image metadata, which can be used with computing devices other than the computing device 450, and the other computing devices can retrieve the image metadata from the reference device 430 when needed.

The image matching module 464 is configured to, upon receiving the template image feature data from the template image processing unit 414 and the reference image feature data from the reference image processing unit 434, match the template image keypoints with the reference image keypoints to obtain matched keypoint pairs, and send the matched keypoint pairs to the homography matrix module 466.

Figure 7A:
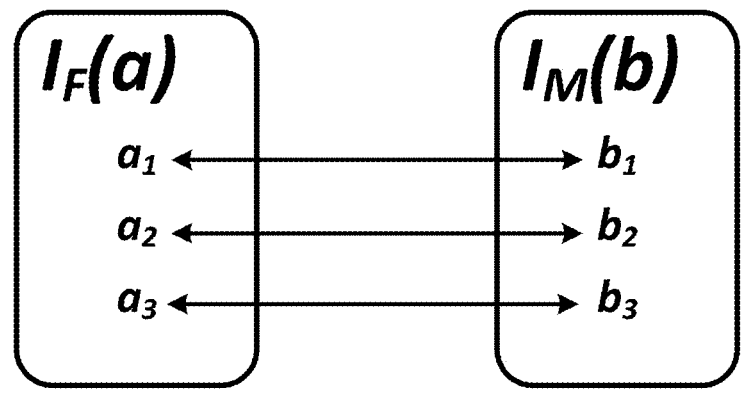
FIG. 7A schematically depicts keypoints matching between two images according to certain embodiments of the present disclosure.

FIG. 7A schematically depicts matching keypoints between two images according to certain embodiments of the present disclosure, where the matching may be performed by the image matching module 464. As shown in FIG. 7A, given two images $I_F(a)$ and $I_M(b)$, where a and b are keypoints in the images, the purpose of the image matching module 464 is to find the correspondence between the keypoints $a_1, a_2, a_3, \ldots$ in the image $I_F(a)$ and the keypoints $b_1, b_2, b_3, \ldots$ in the image $I_M(b)$. Kindly note that the numbers of keypoints in $I_F(a)$ and $I_M(b)$ are generally not the same. However, after matching, the matched keypoint pairs for the template image and the reference image have one-on-one keypoint correspondence, while some of the keypoints have no matches. In certain embodiments, the image matching module 464 uses a k-nearest neighbors algorithm (k-NN) based method to perform the matching between the template image and the reference image. Particularly, the k-NN searches for the closest match of each keypoint of $I_F(a)$ in $I_M(b)$, where the closest match is the keypoint $b_j$ in $I_M(b)$ that has the minimum Euclidean distance from $a_i$ (measured with their descriptor vectors). For each keypoint in $I_F(a)$, this method can always find its closest matching keypoint in $I_M(b)$. However, the method might generate wrong matching pairs, since some keypoints in $I_F(a)$ may not have a match in $I_M(b)$ at all, and vice versa.

Figure 7B:
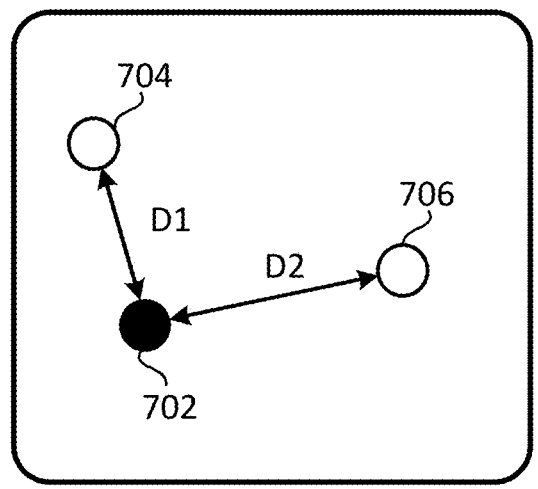
FIG. 7B schematically depicts ratio of distance (ROD) in k nearest neighbors according to certain embodiments of the present disclosure.

To solve this problem, Lowe presented a k-NN based method which eliminates false matching by the ratio of distance (ROD) (D. G. Lowe, Distinctive image features from scale-invariant keypoints, Int. J. Comput. Vis., 2004, 60(2): 91-110, which is incorporated herein by reference in its entirety). ROD compares the distance of $a_i$ to its closest match to the distance of $a_i$ to its second closest match. As shown in FIG. 7B, based on their feature descriptors, a keypoint 702 in a template image has the closest Euclidean distance with a keypoint 704 and the second closest Euclidean distance with a keypoint 706 in the reference image. The distance from the keypoint 702 to its closest match 704 is D1, and the distance from the keypoint 702 to its second closest match 706 is D2. If D1/D2>R (R is a threshold ratio), that means the 702-704 pair is not a very reliable matching. Thus, the 702-704 pair and the 702-706 pair will both be discarded, and the keypoint 702 will be removed from this matching process. Otherwise, the keypoint 702 is paired with its closest match 704 (the 702-706 pair is discarded) if D1/D2≤R. This means, to have a reliable matching, the distance between a keypoint in the template image and its closest match in the reference image should be significantly smaller than the distance between this keypoint and its second closest match in the reference image. Lowe's experiment showed that ROD eliminates 90% false matches while discarding less than 5% of correct matches when the ratio is set to 0.8.

ROD performs very well in most cases. However, hard coding the threshold might eliminate too many good matching pairs in some scenarios which yields an insufficient sample size. If there are no enough matching pairs in the sample, the estimation result will be unstable. To overcome this problem so that the algorithm will work well for universal input, the present disclosure provides the Minimum Ratio Of Distance (MROD) method. Instead of hard coding the threshold, the disclosure sorts the matches by the ratios of distance ascendingly, keeps the first s pairs of matches for building the homography model, and discards the rest of them. Therefore, we can always get a sample with size s to estimate the homography matrix, as long as there are enough keypoints in the images. The value of s may be determined based on the image data and the actual implementation. In certain embodiments, s is a positive integer in the range of 30-1000. In certain embodiments, s is in the range of 50-500. In certain embodiments, s is in the range of 100-200. For example, s may be set to 100, 150 or 200. After obtaining the matching between the template image and the reference image, the image matching module 464 is further configured to send the template image feature data, the reference image feature data, and the matching information to the homography matrix estimation module 466.

The homography estimation module 466 is configured to, upon receiving the matched keypoint pairs, the template image feature data, and the reference image feature data from the image matching module 464, estimate the homography matrix from the template image to the reference image, and provide the homography matrix, the template image feature data, and the reference image feature data to the aiming device 6DOF module 468 and the aiming point (or other point of interest) determination module 470. A homography H is the transformation between two planes, and can be represented by a 3*3 matrix:

$$H = \begin{bmatrix} h_{11} & h_{12} & h_{13} \\ h_{21} & h_{22} & h_{23} \\ h_{31} & h_{32} & h_{33} \end{bmatrix}. \quad (1)$$

The present disclosure defines $\Omega_F$ as the image space of the template image $I_F$, and defines $\Omega_M$ as the image space of the reference image $I_M$. A keypoint (x, y) in the template image space $\Omega_F$ may then be projected to the reference image space $\Omega_M$ by multiplying the H, so as to obtain the projected keypoint (x', y') in the reference image $\Omega_M$:

$$\begin{bmatrix} x' \\ y' \\ 1 \end{bmatrix} = H * \begin{bmatrix} x \\ y \\ 1 \end{bmatrix}. \quad (2)$$

The whole process of keypoint and feature extraction, keypoint matching between images, and homography estimation between images are named image registration. In the image registration, the homography estimation is the most critical part because the quality of the homography matrix directly affects the final result. Therefore, it is necessary in homography estimation to avoid the side effect of wrong keypoint matches since MROD cannot preclude all of them.

In certain embodiments, the most common method to estimate homography matrix is RANSAC (Cantzler, Random sample consensus (RANSAC), http://citeseerx.ist.psu.edu/viewdoc/summary?doi=10.1.1.106.3035, which is incorporated herein by reference in its entirety). RANSAC randomly selects subsets from the keypoint matching sample to build homography model, then refines the model iteratively. In statistics, outliers are the data that do not fit the model, whereas inliers have values that fit the statistical distribution. At first, RANSAC randomly selects four pairs of matched keypoints from the sample called hypothesis inliers subset. Then it uses this hypothesis inliers subset to compute the homography matrix H. Initially H could be very inaccurate. During every iteration, His evaluated by computing how many pair of matched keypoints are inliers for this model H. A pair of keypoint p from the reference image and q from the template image is inlier if:

$$\|p-H*q\|<\text{Reprojection Error Threshold} \quad (3).$$

If H is not good enough to be accepted, another group of hypothesis inliers will be selected and RANSAC repeats the process above until the homography matrix H can be accepted, or until the process reaches the maximum iteration limit. However, because RANSAC might jump out of the iteration without finding the optimal model (reach maximum iteration times or enough number inliers fit current reprojection error), there is uncertainty on the model estimated by RANSAC.

As an improvement of RANSAC, PROgressive SAmple Consensus (PROSAC) is provided (O. Chum and J. Matas, Matching with PROSAC-progressive sample Consensus, CVPR 2005, which is incorporated herein by reference in its entirety). PROSAC introduces a similarity function used in establishing tentative correspondences. In other words, PROSAC does not randomly pick up hypothesis inliers subset but draw from progressively sets of top-ranked correspondences. The computation speed of PROSAC is up to more than a hundred times faster than RANSAC.

In order to find the near optimal model for estimating homography, in certain embodiments, the present disclosure computes different models via PROSAC by changing the reprojection error threshold, and then evaluates the different models by calculating the Mean Square Error (MSE). With the high computation efficiency of PROSAC, the disclosure can build several homography models and evaluate them with MSE which is defined as:

$$\text{MSE}(H,I_F,I_M)=\Sigma\|I_M(p)-H*I_F(p)\| \quad (4),$$

where p is matching keypoints of two images. The H with the lowest MSE will be used as image registration result. By combining PROSAC with MSE, the present disclosure achieves more accurate/reliable homography matrix.

Referring back to FIG. 4, the aiming device 6DOF module 468 is configured to, upon receiving the homography matrix H, the template image feature data, and the reference image feature data from the homography estimation module 464, and retrieving the template and reference image metadata, determine 6DOF of the aiming device 412, and provide the 6DOF information to the aiming point determination module 470 and to the user via the user interface 472. The aiming device 6DOF includes the aiming device position information in 3D world coordinate (x, y, z) and aiming device's attitude in 3D world coordinate. The aiming device attitude is normally expressed by three values related to angle. In certain embodiments, they are device heading angle, device pitch angle, and device roll angle.

FIGS. 8A-8G illustrate the algorithm used in certain embodiments to obtain the 6DOF of the aiming device 412.

Figure 8A:
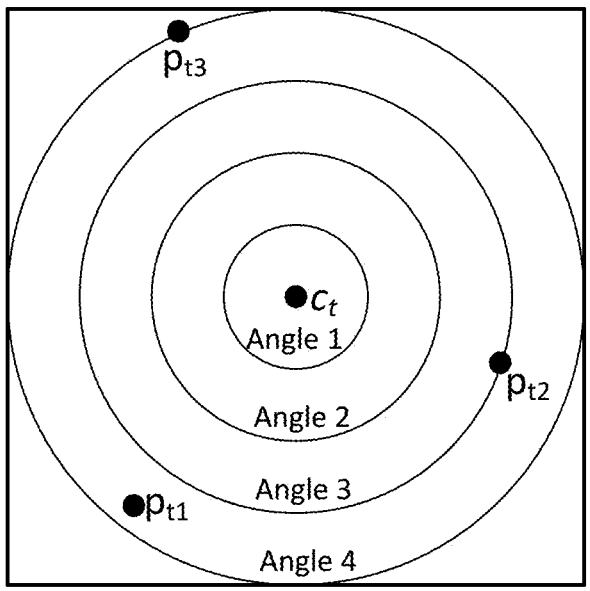
FIG. 8A schematically depicts correspondence between ray line angles started from a camera and pixel location in a template imagen, three selected points, and a center point, according to certain embodiments of the present disclosure.
Figure 8B:
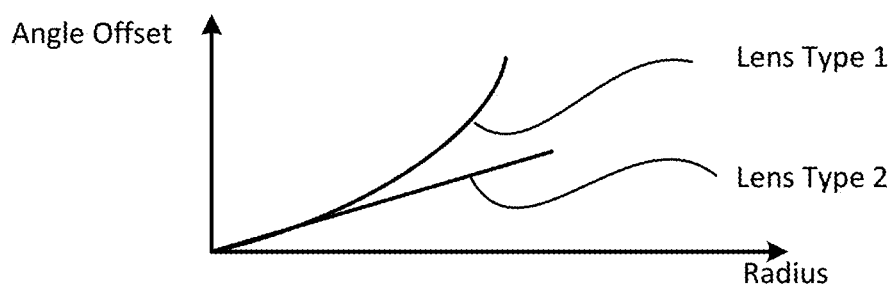
FIG. 8B schematically depicts radius and angle relationship for cameras.

FIG. 8A schematically depicts correspondence between the ray line angle started from a camera and pixel location in the image taken with the camera. Assuming that the square in FIG. 8A is the image taken from a digital camera, the center of image "$c_t$" should represent the camera lens center axis. In the 3D world, it is one of the ray lines radiated from the OCC to outside. Besides this center point $c_t$, any pixel on the image represents a ray line, which also starts from the OCC, but with an angle offset to the camera lens center axis. On the image, the distance from pixel location to image center has a fixed relation with the ray line angle offset. This relation depends on the camera lens' optical design. If we use the image center as the circle center, draw multiple concentric circles on the image with different radiuses, any point on a specific circle will have a certain ray line angle or angle offset. Namely, for a given lens, there is a fixed relation between circle radius and ray angle offset. Based on camera lens design, the relation between radius and ray angle offset could be a different curve in a radius-angle diagram, as shown in FIG. 8B. This curve completely depends on lens design. For a known lens, it is a known curve.

Referring back to FIG. 8A, points $p_{t1}$, $p_{t2}$, and $p_{t3}$ are selected from the template image. The pixel distances from $p_{t1}$, $p_{t2}$, and $p_{t3}$ to the image center $c_t$ could be converted to the angle offset using the curve in FIG. 8B, and the corresponding angles are $\alpha_1$, $\alpha_2$, and $\alpha_3$, respectively, for $p_{t1}$, $p_{t2}$, and $p_{t3}$.

Figure 8C:
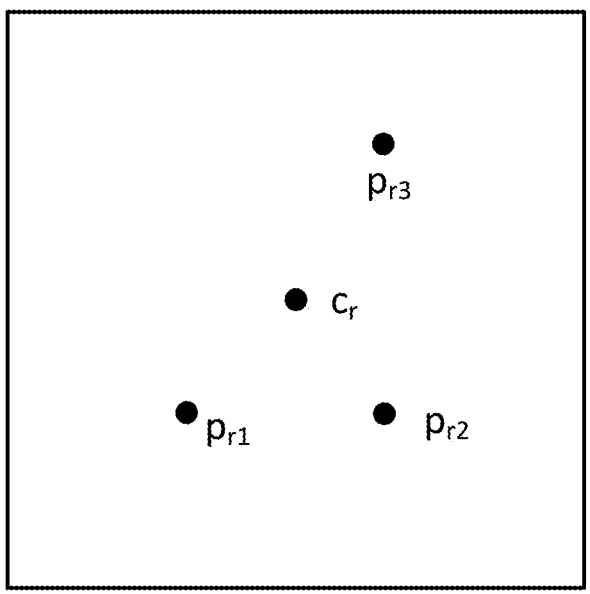
FIG. 8C schematically depicts four points in a reference image corresponding to the four points in FIG. 8A.

Because $p_{t1}$, $p_{t2}$, and $p_{t3}$ and the template image center $c_t$ are on the template image, they could be mapped into the reference image using the template mapping method described above. FIG. 8C schematically depicts the mapping result. The points on the template image are mapped into the reference image as $p_{r1}$, $p_{r2}$, $p_{r3}$ and $c_r$, and $c_r$ generally is not the center of the reference image.

Because any point on the reference image have a corresponding point in the 3D world coordinates, $p_{r1}$, $p_{r2}$, $p_{r3}$ and $c_r$ on the reference image will have corresponding points in the 3D world coordinate system. Those points are $P_1$, $P_2$, $P_3$ and C shown in FIG. 8D. $P_1$, $P_2$, $P_3$ and C, each has its corresponding 3D world coordinates [x, y, z]. In certain embodiments, the 3D world coordinates of the points can be easily determined by checking a look up table that lists the 2D reference image pixels (pixel coordinates)-3D world coordinates prepared by the reference image preparation module 462. In certain embodiments, the determination of the 3D world points can be performed by calling the aiming point determination module 470, and the difference is that the disclosure is not determining the specific aiming point, but arbitrarily selected points, and the determination process only includes (1) mapping the template image points from the template image to the reference image points on the reference image, and (2) finding 3D coordinates of the 3D world points corresponding to the reference image points based on the 2D template image pixel-3D world coordinates correspondence.

Figure 8D:
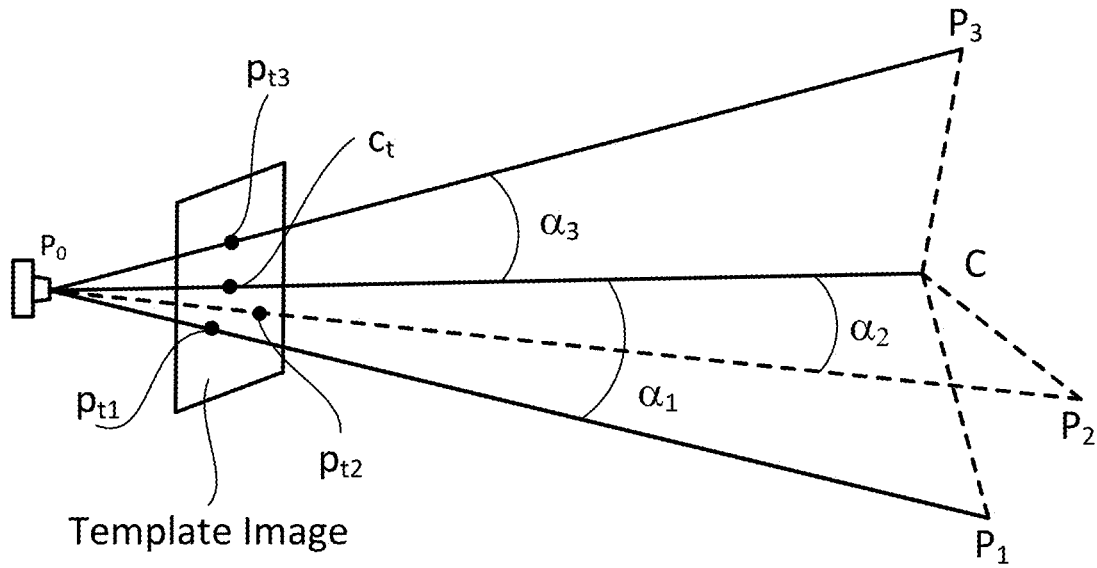
FIG. 8D schematically depicts 3D world coordinates for the four points in FIG. 8C according to the coordinates of the three points in FIG. 8B.

FIG. 8D schematically depicts in 3D world coordinate system, camera, template image plane, and 3D points $P_1$, $P_2$, $P_3$ and C. The template image could be viewed as a plane in front of the camera lens. The camera lens axis starts from the camera 3D location $P_0$, through the template image center $c_t$, and finally reaches the 3D point C. Three ray lines start from $P_0$, through the template image at $p_{t1}$, $p_{t2}$, and $p_{t3}$, and finally reach 3D points $P_1$, $P_2$, $P_3$. From FIG. 8D, the angle between line $P_0C$ and $P_0P_1$ could be expressed in two different ways:

(1) From $p_{t1}$ location on the template image using the curve in FIG. 8B, which is a known value $\alpha_1$.

(2) From the vector calculation rule: a) the cosine of the angle between two vectors is equal to the dot product of these vectors divided by the product of vector magnitudes; or b) the sine of the angle between two vectors is equal to the magnitude of the cross product of these two vectors divided by the product of their vector magnitudes. Here $P_0C$ and $P_0P_1$ are two vectors. Combining (1) and (2), an equation can be established as:

$$\sin(\alpha_1)=|P_0C \times P_0P_1|/|P_0C||P_0P_1| \quad (5)$$

The same deduction for $P_0P_2$ and $P_0P_3$ could create the other two equations:

$$\sin(\alpha_2)=|P_0C \times P_0P_2|/|P_0C||P_0P_2| \quad (6)$$

$$\sin(\alpha_3)=|P_0C \times P_0P_3|/|P_0C||P_0P_3| \quad (7)$$

All parameters in the equations (5)-(7) are known except for template camera location $P_0$, which includes three coordinates $(x_0, y_0, z_0)$. By solving the above three equations, the disclosure can determine $P_0$ $(x_0, y_0, z_0)$. In certain embodiments, numerical methods, such as Randomization Algorithm or Newton Method, is used to solve this group of equations by the aiming device 6DOF module 468. Until this step, the aiming device position $P_0$, which is [x, y, z] values of 6DOF, is obtained.

When the point on the template image is the PAL-T point, the PAL-3D point can be found the same way as the three arbitrarily points $p_{t1}$, $p_{t2}$, and $p_{t3}$, and the process is also described below in the description of the aiming point determination module 470. Once $P_0$ is found, the line from $P_0$ to PAL-3D becomes a known line. This is the PAL line in the 3D world. Because it is parallel to the LOI of the aiming device, the heading, pitch, and roll angles of PAL are the same as that of LOI. So heading, pitch, and roll angles for PAL will be the remaining unknown values of 6DOF, namely aiming device's attitude.

Figure 8E:
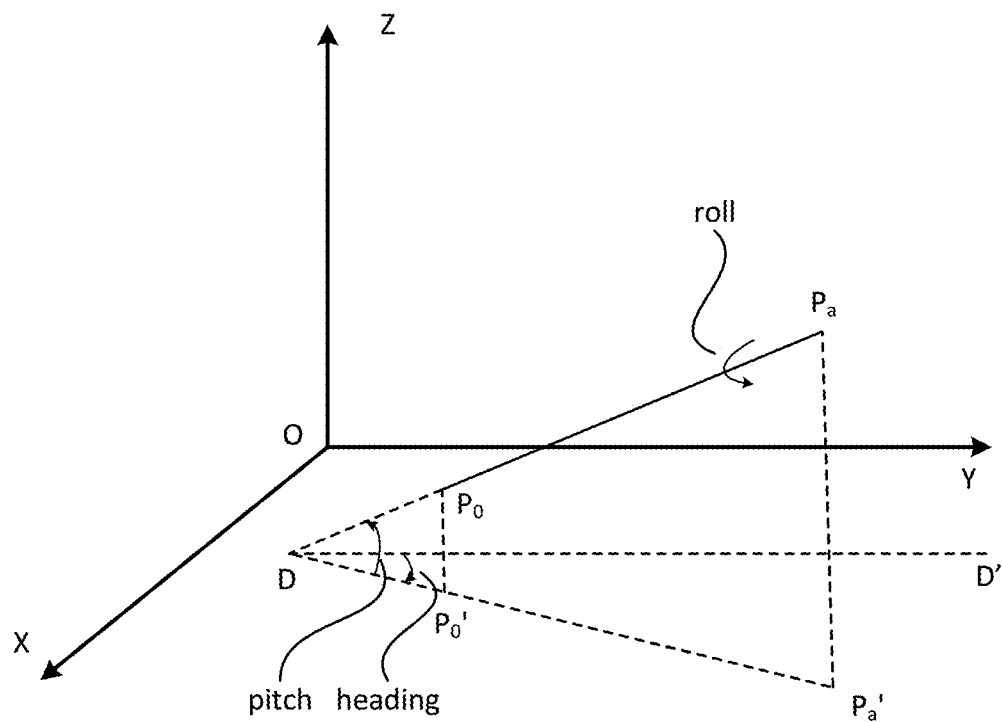
FIG. 8E schematically depicts the calculation of heading and pitch angles of the camera in FIG. 8D according to certain embodiments of the present disclosure.

In certain embodiments, the method used by the present disclosure to find PAL heading and pitch is shown in FIG. 8E. The PAL-3D point is noted as $P_a$. In the 3D real world coordinate system OXYZ, the PAL line is vector $P_0P_a$ (direction from $P_0$ to $P_a$). The line $P_0P_a$ extends towards the horizontal plane OXY and intersects with OXY at point D; the line DD' is parallel to Y-axis; the point $P_0$ is projected to the horizontal surface OXY at the point $P'_0$; and the point $P_a$ is projected to the horizontal surface OXY at the point Pa. The heading angle of the vector $P_0P_a$ is defined as the angle between Y-axis (or DD') to the projection line $P'_0P'_a$; the pitch angle of the vector $P_0P_a$ is defined as the angle between $P'_0Pa$ to $P_0P_a$; the roll angle is defined as the rotation angle around the vector $P_0P_a$. They can be measured using the 3D coordinates of $P_a$ and the 3D coordinates of the aiming device location $P_0$. If $P_0$ coordinate is noted as $(x_0, y_0, z_0)$ and $P_a$ coordinate is noted as $(x_a, y_a, z_a)$, the heading h will have:

$$\tan(h)=(x_a-x_0)/(y_a-y_0) \quad (8)$$

The pitch p will have:

$$\tan(p)=(z_a-z_0)/\sqrt{(x_a-x_0)^2+(y_a-y_0)^2} \quad (9)$$

Figure 8F:
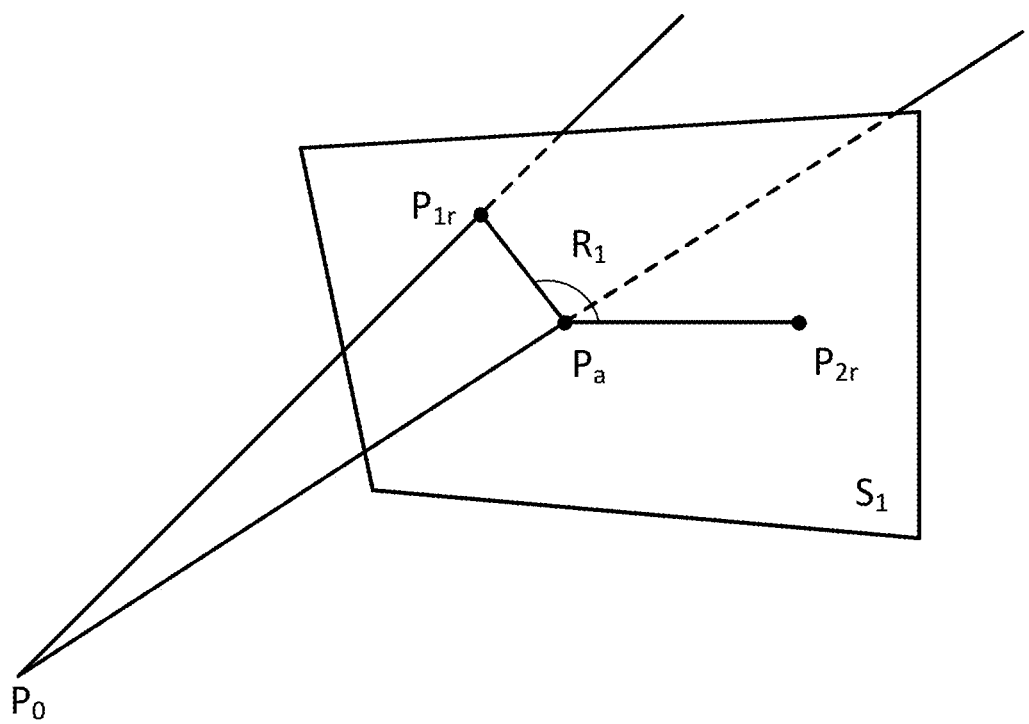
FIG. 8F and FIG. 8G schematically depicts the calculation of roll angles according to certain embodiments of the present disclosure.
Figure 8G:
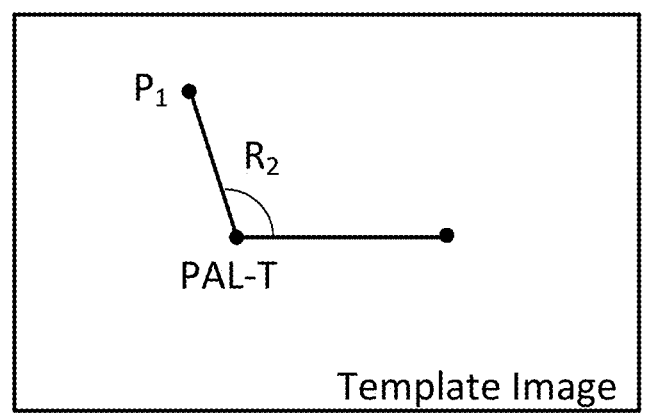

Further, as shown in FIG. 8F and FIG. 8G, the roll angle can be found using the following procedure:

1. Define a plane perpendicular to line $P_0P_a$ and pass point $P_a$; the plane is noted as $S_1$ and find the intersection of line $P_0P_1$ and $S_1$, note this point as $P_{1r}$. On the plane $S_1$ define another point that is with the same z value with $P_a$. Note this point as $P_{2r}$. Find the angle between vector $P_aP_{1r}$ and $P_aP_{2r}$. Note the angle as $R_1$.

2. On the template image, draw a line from the PAL-T point to $p_1$, calculate the angle between this line and horizontal line in 2D Template image coordinate (parallel to the 2D template image top/bottom boundaries), note it as $R_2$.

3. The difference between $R_1$ and $R_2$ is the aiming device's roll angle. Whether it is positive or negative is determined by the coordinate system used here.

4. Kindly note that $P_a$ and PAL-T are chosen for convenience, and the disclosure can choose other arbitrary point in FIG. 8F and FIG. 8G. Particularly, if 6DOF is required and the aiming point is not required, the disclosure may not need to define a PAL-T point corresponding to the aiming point. Under this situation, for example, the disclosure can set an arbitrary LOI, get the PAL for the LOI, determine the PAL-T, and use the PAL-T to determine the 6DOF as shown in FIG. 8F and FIG. 8G, but the PAL-T is not corresponding to the aiming point (or in certain embodiments, there is no aiming point for the aiming device at all).

Up to now, the 6DOF information of the aiming device is fully determined. The implementation of heading, pitch and roll angles calculation is implemented by the aiming device 6DOF module 468, which also calls the aiming point determination module 470 for point mapping from the template image to the reference image, and for 3D point determination from the reference image to the 3D world. After determining the 6DOF of the aiming device, the aiming device 6DOF module 468 is further configured to send the 6DOF to the aiming point determination module 470.

Figure 9A:
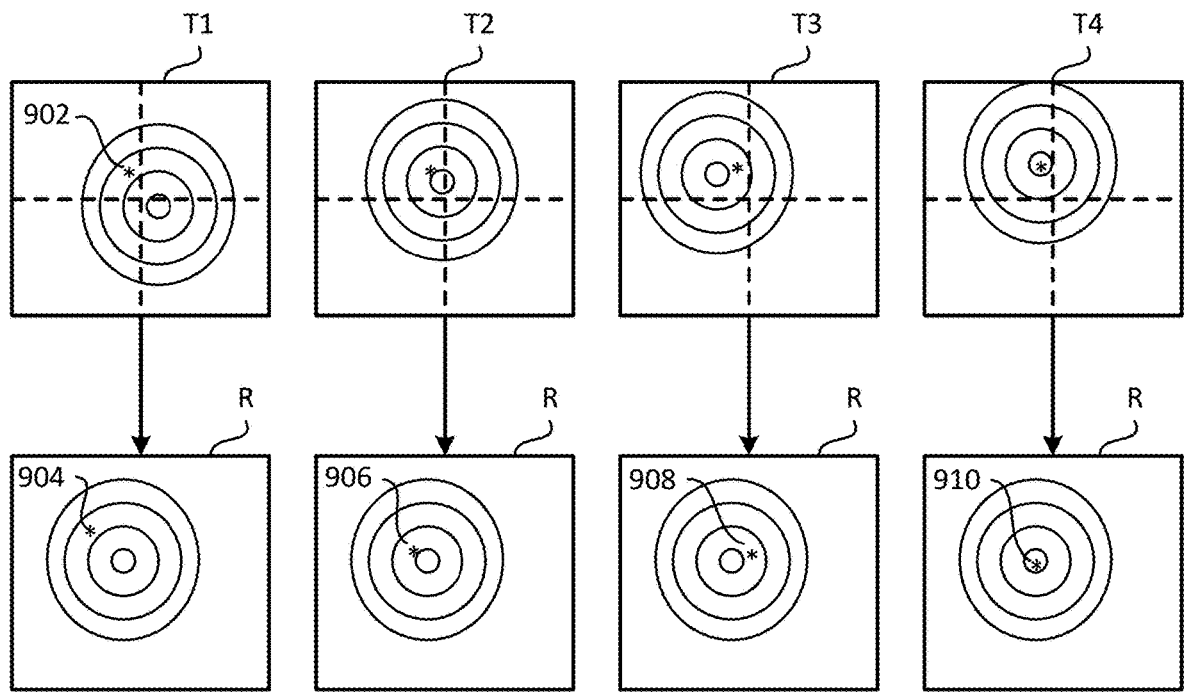
FIG. 9A schematically depicts point mapping between four sequential template images and one reference image according to certain embodiments of the present disclosure.
Figure 9B:
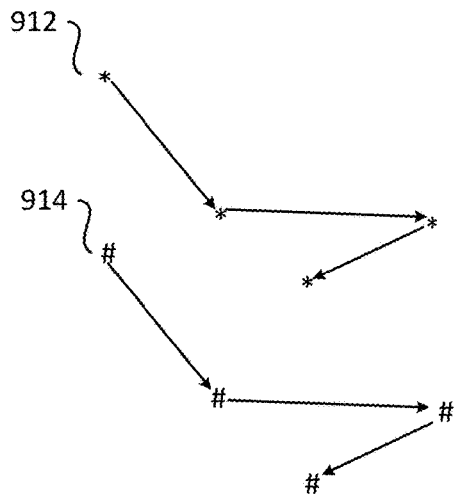
FIG. 9B schematically depicts a track of PAL-3D points and a track of aiming points in 3D world according to certain embodiments of the present disclosure.
Figure 9C:
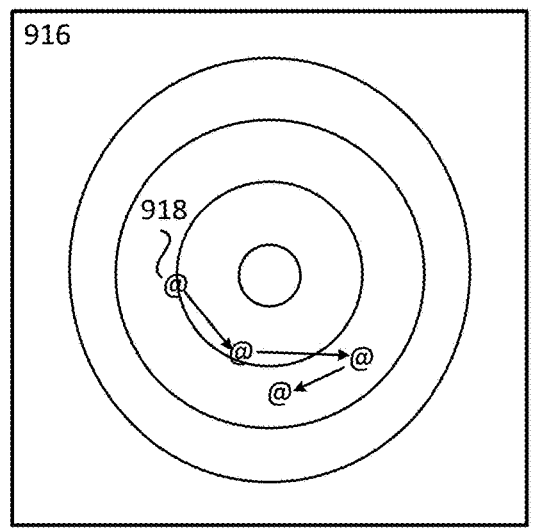
FIG. 9C schematically depicts a track of aiming points in a target image according to certain embodiments of the present disclosure.

The aiming point determination module 470 is configured to, upon receiving the homography matrix H, the template image feature data, and the reference image feature data from the image matching module 464, the aiming device 6DOF from the aiming device 6DOF module 468, and retrieving the template and reference image metadata, determine PAL-R in the reference image from the PAL-T in the template image, determine the PAL-3D from the PAL-R, determine 3D coordinates of the aiming point based on the PAL-3D, and provide a trace of the aiming point in a target image. FIGS. 9A-9C schematically depicts determining the PAL-R in the reference image from the PAL-T in the template image, obtaining 3D aiming point from the PAL-R, and obtaining the trace or track of the 3D aiming points. The process can be described as follows: (1) Find the PAL-T point on the template image as described above in relation to the explanation of the aiming device complex calibration module 460. (2) Find the PAL-R point on the reference image as described above in relation to the explanation of the image matching module 464 and the homography estimation module 466. When the homography between the template image and the reference image is determined, and the PAL-T point in the template image is defined, the PAL-R can be easily determined based on the mapping from the template image to the reference image. (3) Find the PAL-3D point in the 3D world coordinate system. Based on the 2D reference image pixels-3D world coordinates correspondence, which could be a lookup table, PAL-R point on the reference image can be mapped to a point in the 3D world. (4) Find the aiming point in the 3D world coordinate system. The PAL-3D point and the aiming point have a relation defined by $f_x$ and $f_y$ in the aiming device body coordinate system. In certain embodiments, the disclosure uses the aiming device position and attitude parameter (6DOF) to create a 4×4 transformation matrix between the 3D world coordinate and the aiming device body coordinate. Then the disclosure uses this 4×4 matrix to convert $(f_x, f_y)$ from the aiming device coordinate to 3D world coordinate. Finally, the disclosure applies the converted $(f_x, f_y)$ to the PAL-3D point and get the final 3D aiming point.

Particularly, at this stage, the intersection between PAL and the surface of the aimed object area is found in the 3D world coordinate system. The point is called PAL-3D. PAL is parallel to the LOI of the aiming device and the offset between these two parallel lines are knows as $f_x$ and $f_y$ (See FIG. 1B), where $f_x$ and $f_y$ are defined in the aiming device body coordinate system. When the aiming device attitude (normally expressed by heading, pitch, and roll angles) is available through the aiming device 6DOF module 468, the intersection between the LOI of the aiming device and the surface of the aimed object area could be deduced from the parallel line relationship. In a lot of engineering practices, the aiming device attitude could be obtained from other sources. For example, for most weapons, the aiming practice requires that weapon cant (roll) angle be zero. For most of the weapon aiming training practices, it is assumed that the weapon and target are very close on the horizontal level, so the pitch angle is close to zero. For some aiming devices, such as mortar sight, before aiming, the aiming device platform has to be leveled. This means that both the pitch and roll angles are zero. Therefore, with an assumption of heading, pitch, and roll of 0, the aiming point can be determined without knowing the exact aiming device 6DOF from the aiming device 6DOF module 468. However, with the exact aiming device 6DOF by the disclosure, the determination of the 3D coordinates of the aiming point is much more accurate.

Upon these assumptions, the aiming point of the aiming device in the 3D world coordinates (aiming point-3D) could be found by creating the 4×4 transformation matrix between the 3D world coordinate and the aiming device body coordinate using the aiming device 6DOF, converting the $(f_x, f_y)$ from the aiming device coordinate to the 3D world coordinate using the 4×4 matrix to obtain the converted $(f_x, f_y)$, and applying the converted $(f_x, f_y)$ to the PAL-3D point to obtain the final 3D aiming point. If the above process repeats multiple times for different points with different timestamps, the trace of the aiming point of the aiming device could be found. The 3D world coordinates of the aiming points at different times can be stored in the computing device 450 and can be displayed in various ways.

FIG. 9A schematically depicts correspondence between four sequential template images and the reference image. As shown in FIG. 9A, each of the template images T1, T2, T3, and T4 has a PAL-T point 902 highlighted by a symbol "*".

The location of each of the PAL-T points 902 in the template images has been calibrated in advance. After calibration, the coordinates of the PAL-T point 902 in all four template images are the same. In other words, the PAL-T points in the template images have the same pixel coordinates in the template image coordinate system. Because of the movement of the aiming device at different times, the views of the template images are different, and the aimed object would locate at different parts of the template images. On the other hand, the reference image R may be a standard stationary image taken in advance. Even if there are several reference images R, the location of the aimed object would be substantially the same in the reference images. The template image T1 is matched to the reference image R, and the corresponding homography transformation matrix H is obtained as described above by the homography estimation module 466. At this time, the aiming point determination module 470 is configured to obtain the corresponding PAL-R point location 904 in the reference image R using the homography transformation matrix H and the PAL-T point 902. Aiming point determination module 470 is further configured to do the same for the sequential template images, and obtain the corresponding PAL-R point locations 906, 908, and 910 in the reference image R. Each PAL-R point 904-910 has a corresponding PAL-3D in the 3D world coordinate system. FIG. 9B schematically depicts a trace 912 of the PAL-3D at different times, where the locations of the PAL-3D points are indicated by the symbol "*." Because the PAL and LOI are parallel, the 6DOF of the aiming device is known, and the offset between the PAL and the LOI in the aiming device body coordinate system is known, the aiming points-3D in the 3D world coordinate system can be calculated. The aiming points-3D are indicated by the symbol "#," and the trace of the aiming points-3D is labeled 914. After the 3D world coordinates of the aiming points (aiming points-3D) are obtained, the aiming points-3D can be stored in the computing device 450, and the aiming points-3D can be used by various ways. For example, as shown in FIG. 9C, the trace 914 of the aiming point-3D can be converted to locations in an enlarged image 916 of the target, so as to obtain a trace 918 of the aiming point in the target image 916.

Kindly note that the above aiming point detection algorithm assumes that the aiming device attitude angles (heading, pitch and roll) are known because there are ways to determine them. In case that there is no other way available to determine the attitude of the aiming device, the aiming device's 6DOF will be calculated by the aiming device 6DOF module 468 first as described above. With the exact 6DOF of the aiming device, the location of the aiming point can be calculated accurately.

The user interface 472 is configured to provide a graphical user interface for the computing device 450. In certain embodiments, the user or the administrator of the system is able to configure parameters for the modules in the aiming device tracking application 458. In certain embodiments, the user interface 472 is further configured to display the tracking result of the aiming device, such as the trace 918 of the aiming points in the target image 916. The trace 918 may include specific aiming point locations in the target image 916, and optionally the 6DOF of the aiming device.

In certain embodiments, all devices are connected by a computer network system, and a special algorithm will minimize network data flow. Also, a specific algorithm and software coding structure is designed to support real-time processing and generate output data.

Figure 10:
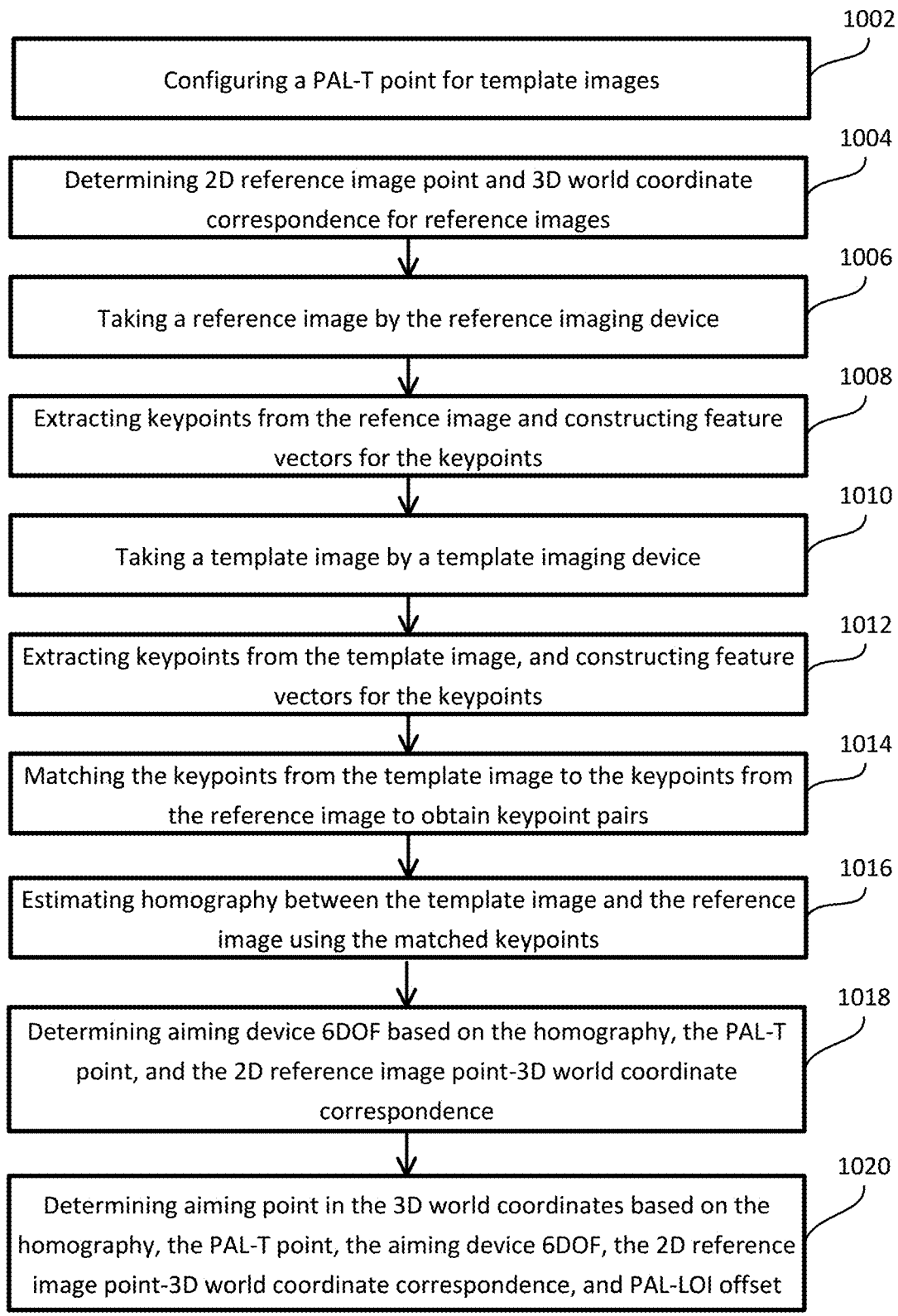
FIG. 10 schematically depicts a process for aiming device tracking according to certain embodiments of the present disclosure.

FIG. 10 schematically depicts a process for aiming device tracking according to certain embodiments of the present disclosure. In certain embodiments, the tracking process is performed by a system, such as the system 400 shown in FIG. 4. It should be particularly noted that, unless otherwise stated in the present disclosure, the steps of the tracking process may be arranged in a different sequential order, and are thus not limited to the sequential order shown in FIG. 10. In certain embodiments, some steps may even be skipped.

As shown in FIG. 10, at procedure 1002, the aiming device complex calibration module 460 calibrates the aiming device complex to obtain template image metadata, such that the template image metadata are available to the aiming device 6DOF module 468 and the aiming point determination module 470. The template image metadata may include, for example, width, height, field of view, and angles of the template image, and PAL-T coordinates in the template image.

At procedure 1004, the reference image preparation module 462 prepares reference image metadata, such that the reference image metadata are available to the aiming device 6DOF module 468 and the aiming point determination module 470. The reference image metadata may include, for example, width and height of the reference image, and relationship between the pixel coordinates in the reference image and 3D world coordinates corresponding to each of the reference image pixels, With the 2D pixel-3D world coordinates correspondence, a pixel having specific 2D coordinates in the reference image coordinate system would have specific 3D coordinates in the 3D world coordinate system. In certain embodiments, the reference image preparation module 462 predetermines the 2D pixel-3D world coordinates correspondence using location tags, and/or 3D world coordinates of the environment, and/or 3D world coordinates of the aimed object.

At procedure 1006, the reference imaging device 432 takes a reference image and sends the reference image to the reference image processing unit 434. In certain embodiments, the reference imaging device 432 is installed on a predefined location and the reference image is a stationary image having the aimed object in its field of view. In certain embodiments, the reference imaging device 432 is a media player displaying a video on a screen, and the aimed object is an object displayed in the video. In certain embodiments, each of the reference image has a timestamp.

At procedure 1008, upon receiving the reference image, the reference image processing unit 434 extracts keypoints from the reference image, constructs descriptors of the keypoints, and sends reference image feature data to the image matching module 464. The reference image feature data include timestamp, number of keypoints, coordinates of the keypoints, and descriptors of the keypoints. In certain embodiments, the reference image is a video frame with a timestamp, and the reference image processing unit 434 processes the video frames one by one. In certain embodiments, the keypoint extraction and descriptor construction are performed using SURF. In certain embodiments, the reference image processing unit 434 uses a dynamic threshold to control the number of detected keypoints in the reference images, where the dynamic threshold may be determined as shown in FIG. 5.

At procedure 1010, the template imaging device 412 takes a template image and sends the template image to the template image processing unit 414. The template imaging device 414 is installed on the aiming device 412. In certain embodiments, the template imaging device 412 takes a video, and each frame of the video has a timestamp.

At procedure 1012, upon receiving the template image, the template image processing unit 414 extracts keypoints from the template image, constructs descriptors of the keypoints, and sends template image feature data to the image matching module 464. The template image feature data includes timestamp, number of keypoints, coordinates of the keypoints, and descriptors of the keypoints. In certain embodiments, the template image is a video frame image with a timestamp, and the template image processing unit 414 processes the video frames one by one. In certain embodiments, the keypoint extraction and descriptor construction are performed using SURF. In certain embodiments, the keypoint extraction and descriptor construction are performed using deep learning neural networks. In certain embodiments, the template image processing unit 414 uses a dynamic threshold to control the number of detected keypoints in the template images, where the dynamic threshold may be determined as shown in FIG. 5.

Because template image and reference image are taken by separate hardware, the procedures 1006 and 1010 are executed in parallel. Also, the procedures 1008 and 1012 run on separate processors or separate process/thread in the same piece of hardware, so they are concurrent as well.

At procedure 1014, upon receiving the template image feature data and the reference image feature data, the image matching module 464 matches the keypoints in the template image to the keypoints in the corresponding reference image, and sends the matched keypoint pairs to the homography estimation module 466. In case of static reference image, there is only one reference image which is matched to all the template images. When there are a sequence of reference images (such as a video), the template image and the reference image having the same timestamp (or the closest timestamp) are matched to each other.

At procedure 1016, upon receiving the matched keypoint pairs, the homography estimation module 466 uses the matched keypoint pairs to obtain a homography matrix, and sends the homography matrix to the aiming device 6DOF module 468 and the aiming point determination module 470. The homography matrix is an optimal transformation matrix between the template image and its corresponding reference image. In certain embodiments, the estimation is performed using PROSAC. In certain embodiments, several homography models are obtained by PROSAC, and one of them is selected by evaluating MSE. In certain embodiments, the estimation is performed directly from the template image and reference image using a deep learning neural network. In such embodiments, the keypoint extraction and descriptor construction steps are skipped.

At procedure 1018, the aiming device 6DOF module 468 determines 6DOF of the aiming device 412 using the homography matrix, the template image metadata including the PAL-T point, and the reference metadata including the 2D reference image point-3D-world coordinate correspondence, as described above in relation to FIGS. 8A-8F, and sends the 6DOF to the aiming point determination module 470. Further, as described above, the determination of the 6DOF may not need the PAL-T corresponding to the aiming point. Actually, for any one of lines of interest of the aiming device, there is a corresponding PAL, a corresponding PAL-T, and a corresponding PAL-3D, which can be used for determining 6DOF, where the line of interest does not have to have a corresponding aiming point.

At procedure 1020, upon receiving the homography matrix, the PAL-T point, the 2D reference image point-3D world coordinate correspondence, the PAL-LOI offset, and the 6DOF of the aiming device, the aiming point determination module 470 uses the homography matrix and PAL-T point coordinates in the template image to obtain the PAL-R point in the reference image, uses the PAL-R point and the 2D reference image point-3D world coordinate correspondence to obtain the PAL-3D, uses 6DOF of the aiming device (equivalent to the aiming device body coordinate system) and the PAL-LOI offset in the aiming device body coordinate system to obtain the offset in the 3D world coordinate system, and uses the offset in the 3D world coordinate system and the PAL-3D point to obtain the final 3D aiming point in the 3D world coordinate system.

In certain embodiments, the procedures 1010-1016 and 1020 could be repeated multiple times with different timestamps for the same aiming device, which generate a serial of aiming points at different timestamps. It is the aiming point track of an aiming device. In certain embodiments, the method 1000 may further include a procedure to present the aiming point locations, such as displaying the trace of the aiming points in an image of the target. In certain aspects, the present disclosure relates to a non-transitory computer readable medium storing computer executable code. In certain embodiments, the computer executable code may be the software stored in the storage device 456 as described above. The computer executable code, when being executed, may perform the methods described above.

Certain embodiments of the present disclosure, among other things, have the following novel advantages: (1) The template image processing unit 416 is installed on the template imaging device 414 or the aiming device 412, the reference image processing unit 434 is installed on the reference imaging device 432, the template data or reference data transferred from the processing units to the computing device 450 includes keypoints and keypoint descriptors, but not the original template or reference image. As a result, the data transfer load on the network 440 is greatly reduced, and the system 400 can support many aiming device complexes 410 and reference imaging device complexes 430. (2) The keypoint extraction of the images is performed using SURF with a dynamic threshold. The dynamic threshold ensures the number of detected keypoints in a reasonable range. (3) The image matching is performed using minimum ratio of distance (MROD). The novel MROD method removes false matches efficiently, while also ensures a sufficient number of matches for calculating homography transformation matrix between the matched images. (4) The homography transformation matrix is calculated by combining progressive sample consensus (PROSAC) with mean square error (MSE) optimization, which results in an accurate homography transformation matrix. (5) The aiming point of the aiming device on the reference image is determined through image mapping, which avoids using laser or other type of optic means. The method is compatible with various environment without requiring specific light conditions. Further, the method minimizes interferences between different aiming devices, and thus can support a large number of aiming devices. (6) Both the aiming point and the 6DOF of the aiming device can be measured based on the image mapping. As a result, the monitoring of the status of the aiming device at different times is more accurate.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system for determining an aiming point of an aiming device, comprising:
   the aiming device configured to aim toward an aimed object;
   a first camera mounted on the aiming device, configured to capture a template image of the aimed object, wherein the aiming point is an intersection between a line of interest (LOI) of the aiming device and surface of the aimed object, a parallel auxiliary line (PAL) is a line that starts from optical center of the first camera and is parallel to the LOI, and the PAL is shown as a PAL-T point in the template image; and a computing device in communication with the first camera, wherein the computing device comprises a processor and a storage device storing computer executable code, and the computer executable code, when executed at the processor, is configured to:
provide a reference image of the aimed object, wherein each point in the reference image has corresponding 3D coordinates in a 3D world coordinate system;
receive the template image captured by the first camera;
determine a PAL-T point in the captured template image of the aimed object, wherein the PAL-T point is not projected on the aimed object;
map the template image to the reference image to obtain a mapping relation;
project the PAL-T point in the template image to the reference image using the mapping relation to obtain a reference PAL-R point;
determine 3D coordinates (PAL-3D) of the PAL-R point; and
determine 3D coordinates of the aiming point based on the PAL-3D and a relationship between the LOI and the PAL.

2. The system of claim 1, wherein the aiming device comprises a gun, a robotic device, and a range finder, the first camera is configured to take a template video comprising a plurality of the template images, and the computer executable code is further configured to obtain a track of the aiming point.

3. The system of claim 1, further comprising a second camera, wherein the second camera is mounted stationary in a location close to the aimed object and is configured to take the reference image.

4. The system of claim 1, wherein the computer executable code is configured to map the template image to the reference image by:
extracting template keypoints from the template image and constructing template keypoint descriptors for the template keypoints;
extracting reference keypoints from the reference image and constructing reference keypoint descriptors for the reference keypoints;
matching the template keypoints to the reference keypoints based on the template keypoint descriptors and reference keypoint descriptors to obtain matched keypoint pairs; and
obtaining a homography transformation matrix between the template image and the reference image using the matched keypoint pairs.

5. The system of claim 4, wherein the step of extracting template keypoints is performed using speeded up robust features (SURF), and the SURF has a dynamic threshold.

6. The system of claim 5, wherein the dynamic threshold for the template images is determined by:
extracting template keypoints from the template image using a current threshold;
determining if a number of the extracted template keypoints is in a range of [a, b], wherein a and b are positive integers, and b>a;
when the number of extracted template keypoints is within the range of [a, b]:
constructing template keypoint descriptors and keeps the current threshold;

when the number of the extracted template keypoints is less than a: reducing the current threshold by Reduced Threshold=Current threshold/C, constructing the template keypoint descriptors, and using the reduced threshold for a next template image; and
when the number of the extracted template keypoints is greater than b: increases the current threshold by Increased threshold=Current threshold×C, constructing the template keypoint descriptors, and using the increased threshold for the next template image,
wherein C is a positive number in a range of 1.2-10.

7. The system of claim 4, wherein the step of matching the template keypoints to the reference keypoints is performed using k-nearest neighbor (k-NN), and the matched keypoints by k-NN is determined by:
determining a first distance between each of the template keypoint to a nearest reference keypoint, determining a second distance between the template keypoint to a second nearest reference keypoint, and calculating a matching ratio of the template keypoint by dividing the first distance by the second distance;
ranking the template keypoints based on their matching ratios;
selecting a first number of template keypoints having smaller matching ratios; and
forming the matched keypoint pairs using the first number of template keypoints and their matched reference keypoints, wherein the first number is a positive integer in a range of 50-500.

8. The system of claim 4, wherein the step of obtaining the homography transformation matrix is performed by:
constructing a plurality of candidate homography transformation matrix models by progressive sample consensus (PROSAC) using different reprojection error thresholds; and
selecting the candidate homography transformation matrix models having the lowest mean square error (MSE) as the homography transformation matrix.

9. The system of claim 1, wherein the computer executable code is configured to determine the 3D coordinates of the aiming point using six degrees of freedom (6DOF) of the aiming device, and the computer executable code is further configured to determine the 6DOF of the aiming device by:
selecting three template points $pt_1$, $pt_2$ and $pt_3$ in the template image;
calculating three template angles $\alpha 1$, $\alpha 2$, $\alpha 3$ based on distances between the three template points in the template image and a center of the template image;
projecting the three template points $pt_1$, $pt_2$ and $pt_3$ in the template image to the reference image to obtain three reference point $pr_1$, $pr_2$, and $pr_3$, wherein the three reference points have three corresponding points $P_1$, $P_2$, and $P_3$, in the 3D world coordinates;
calculating 3D coordinates of the aiming device $P_0$ based on the three template angles $\alpha_1$, $\alpha_2$, $\alpha_3$ and the 3D coordinates of $P_1$, $P_2$, and $P_3$; and
calculating heading, pitch and roll of the aiming device based on the 3D coordinates of $P_0$, $P_1$, and PAL-3D.

10. The system of claim 1, wherein the computer executable code is further configured to display the aiming point of the aiming device.

11. A method for determining an aiming point of an aiming device, comprising:
capturing, by a first camera, a template image of an aimed object, wherein the aiming device is configured to aim toward the aimed object, the first camera is mounted on the aiming device, the aiming point is an intersection between a line of interest (LOI) of the aiming device and surface of the aimed object, a parallel auxiliary line (PAL) is a line that starts from optical center of the first camera and is parallel to the LOI, and the PAL is shown as a PAL-T point in the template image;

providing, by a computing device, a reference image of the aimed object, wherein the computing device is in communication with the first camera, and each point in the reference image has corresponding three dimensional coordinates in a 3D world coordinate system;

receiving, by the computing device, the template image captured by the first camera;

determine the PAL-T point in the captured template image of the aimed object, wherein the PAL-T point is not projected on the aimed object;

mapping, by the computing device, the template image to the reference image to obtain a mapping relation;

projecting, by the computing device, the PAL-T point in the reference image using the mapping relation to obtain a reference PAL-R point;

determining 3D coordinates (PAL-3D) of the PAL-R point; and determining 3D coordinates of the aiming point based on the PAL-3D and a relationship between the LOI and the PAL.

12. The method of claim 11, wherein the aiming device comprises a gun, a robotic device, and a range finder, the first camera is configured to take a template video comprising a plurality of the template images, and the method further comprises obtaining a track of the aiming points.

13. The method of claim 11, wherein the reference image is captured by a second camera, and the second camera is mounted stationary in a location close to the aimed object.

14. The method of claim 11, wherein the step of mapping comprises:

extracting template keypoints from the template image and constructing template keypoint descriptors for the template keypoints;

extracting reference keypoints from the reference image and constructing reference keypoint descriptors for the reference keypoints;

matching the template keypoints to the reference keypoints based on the template keypoint descriptors and reference keypoint descriptors to obtain matched keypoint pairs; and obtaining a homography transformation matrix between the template image and the reference image using the matched keypoint pairs.

15. The method of claim 14, wherein the step of extracting the template keypoints or extracting the reference keypoints is performed using speeded up robust features (SURF), the SURF has a dynamic threshold, and the dynamic threshold for the template images is determined by:

extracting template keypoints from the template image using a current threshold;

determining if a number of the extracted template keypoints is in a range of [a, b], wherein a and b are positive integers, and b>a;

when the number of the extracted template keypoints is within the range of [a, b]:

constructing template keypoint descriptors and keeps the current threshold;

when the number of the extracted template keypoints is less than a: reducing the threshold by Reduced Threshold=Current threshold/C, constructing the template keypoint descriptors, and using the reduced threshold for processing a next template image; and when the number of the extracted template keypoints is greater than b: increases the current threshold by Increased threshold=Current threshold×C, constructing the template keypoint descriptors, and using the increased threshold for the next template image, wherein C is a positive number in a range of 1.2-10.

16. The method of claim 14, wherein the step of matching the template keypoints to the reference keypoints is performed using k-nearest neighbor (k-NN), and the matched keypoints by k-NN is determined by:

determining a first distance between each of the template keypoint to a nearest reference keypoint, determining a second distance between the template keypoint to a second nearest reference keypoint, and calculating a matching ratio of the template keypoint by dividing the first distance by the second distance;

ranking the template keypoints based on their matching ratios;

selecting a first number of template keypoints having smaller matching ratios; and forming the matched keypoint pairs using the first number of template keypoints and their matched reference keypoints, wherein the first number is a positive integer in a range of 50-500.

17. The method of claim 14, wherein the step of obtaining the homography transformation matrix is performed by:

constructing a plurality of candidate homography transformation matrix models by progressive sample consensus (PROSAC) using different reprojection error thresholds; and selecting the candidate homography transformation matrix models having the lowest mean square error (MSE) as the homography transformation matrix.

18. The method of claim 11, further comprising determining six degrees of freedom (6DOF) of the aiming device by:

selecting three template points p1, p2 and p3 in the template image;

calculating three template angles $\alpha 1$, $\alpha 2$, $\alpha 3$ based on distances between the three template points in the template image and a center of the template image;

projecting the three template points p1, p2 and p3 in the template image to the reference image to obtain three reference points $pr_1$, $pr_2$, and $pr_3$, wherein the three reference points have three corresponding points $P_1$, $P_2$, and $P_3$, in the 3D world coordinates;

calculating 3D coordinates of the aiming device $P_0$ based on the three template angles $\alpha 1$, $\alpha 2$, $\alpha 3$ and the 3D coordinates of $P_1$, $P_2$, $P_3$; and calculating heading, pitch and roll of the aiming device based on the 3D coordinates of $P_0$, $P_1$, and PAL-3D.

19. The method of claim 11, further comprising displaying the aiming point of the aiming device.

20. A system for determining six degrees of freedom (6DOF) of an aiming device, comprising:

the aiming device configured to aim toward an aimed object;

a first camera mounted on the aiming device, configured to capture a template image of the aimed object, wherein there is a line of interest (LOI) of the aiming device and a parallel auxiliary line (PAL) starting from optical center of the first camera and parallel to the LOI, and the PAL is shown as a point (PAL-T) in the template image; and a computing device in communication with the first camera, wherein the computing device comprises a processor and a storage device storing computer executable code, and the computer executable code, when executed at the processor, is configured to:

provide a reference image of the aimed object, wherein each point in the reference image has corresponding 3D coordinates in a 3D world coordinate system;

receive the template image from the first camera;

map the template image to the reference image to obtain a mapping relation;

project the PAL-T in the template image to the reference image using the mapping relation to obtain a reference point (PAL-R);

determine 3D coordinates (PAL-3D) of the PAL-R;

select three template points $pt_1$, $pt_2$ and $pt_3$ in the template image;

calculate three template angles $\alpha 1$, $\alpha 2$, $\alpha 3$ based on distances between the three template points in the template image and a center of the template image;

project the three template points $pt_1$, $pt_2$ and $pt_3$ in the template image to the reference image to obtain three reference point $pr_1$, $pr_2$, and $pr_3$, wherein the three reference points have three corresponding points $P_1$, $P_2$, and $P_3$, in the 3D world coordinates;

calculate 3D coordinates of the aiming device $P_0$ based on the three template angles $\alpha 1$, $\alpha 2$, $\alpha 3$ and the 3D coordinates of $P_1$, $P_2$, and $P_3$; and calculate heading, pitch and roll of the aiming device based on the 3D coordinates of $P_0$, $P_1$, and PAL-3D.

* * * * *